(12) United States Patent  
Nazarathy et al.

(10) Patent No.: US 8,345,335 B2  
(45) Date of Patent: Jan. 1, 2013

(54) ALL-OPTICAL RECONFIGURABLE CASCADABLE LOGIC WITH LINEAR PREPROCESSING BY LIGHTWAVE INTERFERENCE AND POST-PROCESSING BY NONLINEAR PHASE ERASURE

(75) Inventors: Moshe Nazarathy, Haifa (IL); Amir Nevet, Haifa (NL)

(73) Assignee: Technion Research and Development Foundation Ltd., Haifa (IL)

( * ) Notice: Subject to any disclaimer, the term of this patent is extended or adjusted under 35 U.S.C. 154(b) by 463 days.

(21) Appl. No.: 12/476,822

(22) Filed: Jun. 2, 2009

(65) Prior Publication Data

US 2010/0097677 A1    Apr. 22, 2010

Related U.S. Application Data

(60) Provisional application No. 61/057,997, filed on Jun. 2, 2008.

(51) Int. Cl.
*G06E 3/00*   (2006.01)
*G02F 3/00*   (2006.01)

(52) U.S. Cl. .................................. 359/107; 359/108
(58) Field of Classification Search ........... 359/107–108
See application file for complete search history.

(56) References Cited

U.S. PATENT DOCUMENTS 7,126,731 B1 * 10/2006 DiJaili et al. ................ 359/108
2003/0179425 A1 * 9/2003 Romaniuk ................... 359/108

* cited by examiner

*Primary Examiner* — Jade R Chwasz
(74) *Attorney, Agent, or Firm* — Oren Reches

(57) ABSTRACT

There is provided a new architecture for all-optical logic architecture. In this architecture the gate is partitioned into a linear front-end followed by a nonlinear back-end. The logic calculation is practically performed within the linear stage, easing the requirements placed on the non-linear part and thus reducing the gate complexity. The new structures provide flexibility and improved performance for the all-optical logic. The proposed scheme may be integrated optics/electronics. An important additional attribute of our all-optical logic family is reconfigurability, i.e. the ability of the hardware architecture or devices to rapidly alter the functionalities of its components and the interconnection between them as needed.

30 Claims, 7 Drawing Sheets

ALL-OPTICAL RECONFIGURABLE CASCADABLE LOGIC WITH LINEAR PREPROCESSING BY LIGHTWAVE INTERFERENCE AND POST-PROCESSING BY NONLINEAR PHASE ERASURE

CROSS-REFERENCE TO RELATED APPLICATION

This application is a U.S. patent application which is based upon and claims the priority of co-pending, commonly assigned U.S. Provisional patent application Ser. No. 61/057,997, filed Jun. 2, 2008, which is incorporated herein in its entirety.

FIELD OF THE INVENTION

The present invention introduces a new architecture for all-optical logic wherein the gate is partitioned into a linear front-end followed by a nonlinear back-end, the gate may be reconfigured to change its logic function, and all inputs and output may be at the same wavelength.

BACKGROUND OF THE INVENTION

In the last twenty years there has been an active academic research in the domain of realizing digital logic functions (AND, OR, XOR, etc) by means of photonic devices. A main target application would be the realization of the desired all-optical computer, in which photons rather than electrons effect the interactions between the gates. In the last few years such efforts have been re-motivated by the desire to better exploit the high transmission capacity of optical communication network. This is envisioned to be achieved by all-optical networking, wherein the optical packets are routed by ultra-fast smart all-optical switches which interpret the headers and perform the switching functions, all in the optical domain, without involving conversion to electronics and back to optics. There has been some progress at the device level, using various approaches, most of which are based on one of the mechanisms: Cross-Gain Modulation (XGM) [1-5], Cross-Phase Modulation (XPM) [6-7], Four-Wave Mixing (FWM) [8-9] and Cross-Polarization Modulation (XPolM) [10-11]. These mechanisms usually depend on nonlinear effects in a Semiconductor Optical Amplifier (SOA). Other approaches based on Highly NonLinear Fiber (HNLF) were also proposed [12-13]. The XPM and XGM mechanisms inevitably limit the operating speed of such devices due to the carrier recovery time of SOA, where the FWM mechanism, which occurs on femtosecond timescales in SOA, is polarization sensitive and its related power penalty is an evident disadvantage. As for most fiber-based devices, their bulky size and poor power efficiency hinder their practicality.

In general, the desirable properties of all-optical logic devices would be:
  Small Size—Efficient real-estate for Large-Scale Integration;
  Ultra-Fast—Orders-of-magnitude faster than today's electronic gates (i.e., 40 Gb/s and above);
  Low-Power dissipation;
  Logic level restoration;
  Cascadable—ability to interconnect and fan-in/out to form large logic arrays amenable to LSI (Initially hundreds of optical-transistors); and
  Manufacturable—reliably and repeatably fabricated at low cost.

General Background May Be Found in the Following Bibliography
  [1] Sharaiha, A.; Li, H. W.; Marchese, F.; Le Bihan, J., "All-optical logic NOR gate using a semiconductor laser amplifier," Electronics Letters, vol. 33, no. 4, pp. 323-325, 13 Feb. 1997
  [2] Jae Hun Kim; Young Min Jhon; Young Tae Byun; Seok Lee; Deok Ha Woo; Sun Ho Kim, "All-optical XOR gate using semiconductor optical amplifiers without additional input beam," Photonics Technology Letters, IEEE, vol. 14, no. 10, pp. 1436-1438, October 2002
  [3] H. Dong, Q. Wang, G. Zhu, J. Jaques, A. B. Piccirilli, N. K. Dutta, Demonstration of all-optical logic OR gate using semiconductor optical amplifier-delayed interferometer, Optics Communications, Volume 242, Issues 4-6, 8 Dec. 2004, Pages 479-485.
  [4] Kim, S. H.; Kim, J. H.; Choi, J. W.; Byun, Y. T.; Jhon, Y. M.; Lee, S.; Woo, D. H., "All-optical NAND gate using cross gain modulation in semiconductor optical amplifiers," Quantum Electronics and Laser Science Conference, 2005. QELS '05, vol. 2, no., pp. 957-959 Vol. 2, 22-27 May 2005
  [5] Ammar Sharaiha, Joseph Topomondzo, Pascal Morel, "All-optical logic AND-NOR gate with three inputs based on cross-gain modulation in a semiconductor optical amplifier", Optics Communications Volume 265, Issue 1, 1 Sep. 2006, Pages 322-325
  [6] Fjelde, T.; Wolfson, D.; Kloch, A.; Dagens, B.; Coquelin, A.; Guillemot, I.; Gaborit, F.; Poingt, F.; Renaud, M., "Demonstration of 20 Gbit/s all-optical logic XOR in integrated SOA-based interferometric wavelength converter," Electronics Letters, vol. 36, no. 22, pp. 1863-1864, 26 Oct. 2000
  [7] Webb, R. P.; Manning, R. J.; Maxwell, G. D.; Poustie, A. J., "40 Gbit/s all-optical XOR gate based on hybrid-integrated Mach-Zehnder interferometer," Electronics Letters, vol. 39, no. 1, pp. 79-81, 9 Jan. 2003
  [8] Kit Chan; Chun-Kit Chan; Lian Kuan Chen; F. Tong, "Demonstration of 20-Gb/s all-optical XOR gate by four-wave mixing in semiconductor optical amplifier with RZ-DPSK modulated inputs," Photonics Technology Letters, IEEE, vol. 16, no. 3, pp. 897-899, March 2004
  [9] Zhihong Li; Guifang Li, "Ultrahigh-speed reconfigurable logic gates based on four-wave mixing in a semiconductor optical amplifier," Photonics Technology Letters, IEEE, vol. 18, no. 12, pp. 1341-1343, June 2006
  [10] Soto, H.; Diaz, C. A.; Topomondzo, J.; Erasme, D.; Schares, L.; Guekos, G., "All-optical AND gate implementation using cross-polarization modulation in a semiconductor optical amplifier," Photonics Technology Letters, IEEE, vol. 14, no. 4, pp. 498-500, April 2002
  [11] Soto H., Topomondzo J. D., Erasme D., Castro M., "All-optical NOR gates with two and three input logic signals based on cross-polarization modulation in a semiconductor optical amplifier", Optics Communications, volume 218, 1 Apr. 2003, pp. 243-247 (5)
  [12] Yu, C.; Christen, L.; Luo, T.; Wang, Y.; Pan, Z.; Yan, L.-S.; Willner, A. E., "All-optical XOR gate based on Kerr effect in single highly-nonlinear fiber," Lasers and Electro-Optics, 2004. (CLEO). Conference on, vol. 2, no., pp. 3 pp. vol. 2-, 16-21 May 2004
  [13] Lee, J. H.; Nagashima, T.; Hasegawa, T.; Ohara, S.; Sugimoto, N.; Kikuchi, K., "40 Gbit/s XOR and AND gates using polarisation switching within 1 m-long bismuth oxide-based nonlinear fibre," Electronics Letters, vol. 41, no. 19, pp. 1074-1075, 15 Sep. 2005

[14] Hinton, K.; Farrell, P. M.; Tucker, R. S., "The Photonic Bottleneck," Optical Fiber Communication and the National Fiber Optic Engineers Conference, 2007. OFC/NFOEC 2007. Conference on, vol., no., pp. 1-3, 25-29 Mar. 2007

SUMMARY OF THE INVENTION

The present invention introduces a new architecture for all-optical logic. In this architecture the gate is partitioned into a linear front-end followed by a nonlinear back-end. The new structures provide flexibility and improved performance for the all-optical logic, better addressing the list of desirable attributes above. An important additional attribute of our all-optical logic family is reconfigurability, i.e. the ability of the hardware architecture or devices to rapidly alter the functionalities of its components and the interconnection between them as needed.

We introduce a new architecture for all-optical logic. In this architecture the gate is partitioned into a linear front-end followed by a nonlinear back-end. The logic calculation is practically performed within the linear stage, easing the requirements placed on the non-linear part and thus reducing the gate complexity. The new structures provide flexibility and improved performance for the all-optical logic, better addressing the list of desirable attributes above. Moreover, a concern raised over the last few years regarding the fundamental limits of All-Optical processes, may be well addressed by the proposed scheme using integrated optics/electronics. An important additional attribute of our all-optical logic family is reconfigurability, i.e. the ability of the hardware architecture or devices to rapidly alter the functionalities of its components and the interconnection between them as needed.

According to an exemplary embodiment of the invention, an all-optical logic gate is provided, the gate comprising: a linear optical section receiving at least two input wave fields X and Y, and linearly combining said inputs to produce an intermediary wave field output U; and at least one non-linear phase-erasing optical section receiving said intermediary output U of said linear optical section and producing a final output wave field V, wherein: the complex amplitude of said final output field V depends solely on the amplitude of said intermediary field output; wherein said at least two inputs X and Y and said final output waves V of said gate defined as complex two-valued logical alphabet that may be assigned the logic values True and False; and said final output wave V of said gate is a known result of a Boolean logic function of said inputs.

In some embodiments said linear optical section further receiving at least one reference wave field R to be linearly combined with said input wave fields, wherein the complex amplitude values of said reference wave field R is selectable such that said final output wave V is selectable from multiple logic Boolean functions of said inputs.

In some embodiments said multiple logic Boolean functions of said inputs X and Y depends on selecting said value of said reference R and said complex alphabets.

In some embodiments said phase-eraser is insensitive to the phase of said intermediary output U, and further have a thresholding characteristic having output absolute amplitude |V| which is substantially a two-level function of the absolute amplitude |U| of said intermediate output.

In some embodiments said intermediate result U of said linear stage is a linear combination of said logic inputs X, Y and of a single reference R.

In some embodiments said intermediate result U of said linear stage is the linear combination $U=X+Y-R$.

In some embodiments said intermediate result U of said linear stage is a linear combination of X and Y only.

In some embodiments said intermediate result U of said linear stage is the linear combination $U=X+Y$.

In some embodiments said linear optical section further receiving at least two reference wave field $R'_1$ and $R'_2$ to be linearly combined with said input wave fields, wherein the complex amplitude values of said reference wave fields $R'_1$ and $R'_2$ is selectable such that said final output wave V is selectable from multiple logic Boolean functions of said inputs, and wherein said intermediate result U of said linear stage is the linear combination $U=a(X+Y+R'_1+R'_2)$, wherein "a" is a scaling factor.

In some embodiments said intermediate result U of said linear stage is the linear combination $U=aX+bY+S$; wherein "a" and "b", are a scaling factors, and wherein S is a linear combination of all reference values R of the form $S=(c_1R'_1+c_2R'_{2+}\ldots)$, wherein "$c_i$", are a scaling factors; and wherein values of said references $R'_i$ are selected such that output of said Boolean logic function has truth table selected from the group comprising: (N)AND; (N)OR; and X(N)OR.

In some embodiments the value of said reference R is selected such that output of said Boolean logic function has truth table selected from the group comprising: (N)AND; (N)OR; and X(N)OR.

In some embodiments said inputs X,Y assuming values in the complex alphabet $\{A_L, A_H\}$, wherein said linear section performs the linear combination $U=X+Y+S$ wherein S is a linear combination of all reference values R of the form $S=(c_1R'_1+c_2R'_{2+}\ldots)$, wherein "$c_i$", are a scaling factors; and wherein values of said references $R'_i$ are selected such that output of said Boolean logic functions, (N)AND, (N)OR, X(N)OR, by setting the individual references $R'_i$ such that S assumes a value selected from the group $\{0.5A_L+1.5A_H; 1.5A_L+0.5A_H; A_L+A_H\}$ respectively.

In some embodiments said inputs X,Y assuming values in the complex alphabet $\{A_L, A_H\}$, wherein said linear section performs the linear combination $U=a(X+Y)+dS$ wherein "a" and "d" are scaling factors, and wherein S is a linear combination of all reference values R of the form $S=(c_1R'_1+c_2R'_{2+}\ldots)$, wherein "$c_i$", are a scaling factors; and wherein values of said references $R'_i$ are selected such that output of said Boolean logic functions, (N)AND, (N)OR, X(N)OR, by setting the individual references $R'_i$ such that $-(d/a)S$ assumes a value selected from the group $\{0.5A_L+1.5A_H; 1.5A_L+0.5A_H; A_L+A_H\}$ respectively.

In some embodiments said linear optical section receiving at least two inputs X and Y and one reference wave field R and producing an intermediate result U comprises: a first directional coupler (DC) having a first and a second inputs and a first and a second outputs, wherein, said two inputs are connected to inputs X and Y of said all-optical gate, and wherein said first output of said first DC is left dangling; and a second CD having a first and a second inputs and a first and a second outputs wherein, said first input of said second DC is feed by said second output of said first DC; said second input of said second DC is feed by said reference R, said first output of said second DC is left dangling, and said second output of said second DC is used as the output U of said linear stage.

In some embodiments said linear optical section receiving at least two inputs X and Y and one reference wave field R and producing an intermediate result U comprises: a first Y-Junction combiner (YJC) having a first and a second inputs and one output, wherein, said two inputs are connected to inputs X and Y of said all-optical gate; and a second YJC having a first and a second inputs and one output wherein, said first input of said second YJC is feed by said output of said first YJC; said second input of said second YJC is feed by said reference R, and said output of said second YJC is used as the output U of said linear stage.

In some embodiments said linear optical section receiving at least two inputs X and Y and at least one reference wave field R and producing an intermediate result U comprises: a first YJC having a first and a second inputs and one output, wherein, said two inputs are connected to inputs X and Y of said all-optical gate; a second YJC having a first and a second inputs and one output, wherein, said two inputs are connected to two reference signals $R'_1$ and $R'_2$ respectively; and a third YJC having a first and a second inputs and one output wherein, said first input is feed by said output of said first YJC; said second input is feed by said output of said second YJC, and said output is used as the output U of said linear stage.

In some embodiments said first and said second inputs of said second YJC are connected to the same reference signal such that $R'_1=R'_2$.

In some embodiments $R'_1=R'_2=R'$, wherein the value or R' is selected such that said Boolean logic function is one of: (N)AND; (N)OR; and X(N)OR, depending on the value set for the reference signal R', and on the assignment of True/False to the complex input alphabet values.

In some embodiments said complex alphabet from which the logic inputs X and Y assume values is reduced to a real unipolar one {0,A}.

In some embodiments said complex alphabet from which the logic inputs X and Y assume values is reduced to a real bipolar one {+/−A}.

In some embodiments said phase-eraser (PE) comprises a non linear optical element selected from the group comprising: an optical gain medium; and an optical loss medium.

In some embodiments said phase-eraser comprises a saturable gain medium having: a pump input; a control input; a probe input, and output, wherein: said pump input provide pump power for the operation of said gain medium; and said control input controls the propagation of probe signal from said probe input to said output by modifying said medium's gain saturation.

In some embodiments said control and probe signals are substantially orthogonal in at least one optical characteristic selected from the group comprising: spatial distribution; angular distribution; polarization; and propagation mode.

In some embodiments said control and probe signals are having substantially different wavelengths.

In some embodiments said gain medium operates above transparency and provides gain to said probe signal when said control signal assumes its logic Low value, while the medium operates under transparency, and provides loss to the probe when the control assumes its logic High value, such that said PE exhibits a thresholding characteristic.

In some embodiments the gate further comprising at least one phase modulator adopted to control the phase of said probe signal.

In some embodiments the gate further comprising at least one phase-eraser connected to a calibrating control signal and used for calibrating amplitude of its output.

According to another aspect of the current invention, an all-optical logic circuit is provided, said circuit comprising a plurality of interconnected all-optical logic gates; wherein at least two of said plurality of interconnected gates comprise: a linear optical section receiving at least two input wave fields X and Y, and linearly combining said inputs to produce an intermediary wave field output U; and at least one non-linear phase-erasing optical section receiving said intermediary output U of said linear optical section and producing a final output wave field V, wherein: the complex amplitude of said final output field V depends solely on the amplitude of said intermediary field output; wherein said at least two inputs X and Y and said final output waves V of said gate defined as complex two-valued logical alphabet that may be assigned the logic values True and False; and said final output wave V of said gate is a known result of a Boolean logic function of said inputs.

In some embodiments said all optical circuit comprises a plurality of all optical gates substantially as disclosed herein.

Plurality of all-optical logic gates according to the current invention may be integrated into a scaleable processing system. A preferred application of such integrated system is the control of optical communication system.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6c(i) shows an asymmetrical structure using two Y-junction-combiners;

FIG. 6c(ii) shows a symmetrical structure using three Y-junction-combiners using different reference values; and FIG. 6c(iii) shows a symmetrical structure using three Y-junction-combiners using two reference values set to a common value R'.

DESCRIPTION OF THE PREFERRED EMBODIMENTS

Figure 1:
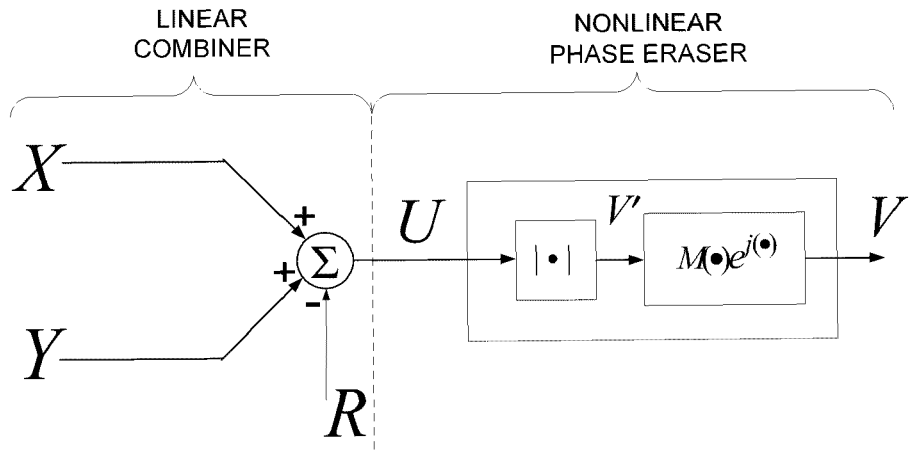
FIG. 1. Schematically depicts an abstract mathematical structure of the All-optical Universal Gate, as a cascade of linear combiner and a phase-erasure module according to an exemplary embodiment of the current invention.

The present invention relates to a devices methods and systems for all-optical logic with application to computing and to optical communication (transmission, reception, repeating, all-optical switching).

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For clarity, non-essential elements were omitted from some of the drawings.

As used herein, an element or step recited in the singular and proceeded with the word "a" or "an" should be understood as not excluding plural elements or steps, unless such exclusion is explicitly recited. In these drawings, elements marked with same or like numbers refer to elements with same or like functions.

In the first section we shall introduce a mathematical structure or architecture capable of abstractly realizing a Reconfigurable Logic Gate (RLG), realizing a variety of two-input Boolean functions (e.g. (N)AND/(N)OR, XOR, XNOR, and NOT) under the control of an auxiliary input, selecting which particular logic function is realized, in effect acting as an all-optical Field-Programmable Gate Array (FPGA) element In the second section we disclose lightwave realizations of the RLG.

1. Abstract Mathematical Architecture of the Reconfigurable Logic Gate

Turning to the first stage of our description, we disclose an abstract logic gate structure consisting of the cascade of two mathematical modules: The first module is a linear system, i.e. it provides "linear preprocessing", and the second module is a non-linear one, i.e. it provides "nonlinear post-processing".

1.1 Linear Combiner

In more detail the first module is a Linear Combiner (LC), adding/subtracting or more generally taking linear combinations with arbitrary complex-valued coefficients of two or three input signals, e.g.

$$U=aX+bY+cR, \quad (0.1)$$

or in particular, preferably and most simply $$U=X+Y-R \quad (0.2)$$

(all the signals are complex-valued scalars—actually the two signals X,Y are the proper inputs while third input R is considered as reference.

1.2 Nonlinear Phase-Erasure (Reset)

The second module is described by a non-linear I/O transformation referred to here as Phase Erasure (PE), or Phase Reset having a non-linear transfer characteristic such that the amplitude and phase of the output are solely functions of the amplitude of the input, both being insensitive to the phase of the optical input (that is the phase information is 'erased' or 'reset'). Mathematically, let U, V (both complex-valued scalars) respectively denote the input and output of the PE module. Notice that the input U to the PE coincides with the output of the first LC stage. The requisite PE Transfer Characteristic (TC) is defined as $$V=e^{j\Phi(|U|)}M(|U|) \quad (0.3)$$

where $M(\bullet)$ and $\Phi(\bullet)$ are arbitrary real-valued functions representing memory-less magnitude and phase nonlinear transfer characteristics (it turns out that the scheme also works if these nonlinear mappings have memory, i.e. the I/O signals are considered waveforms rather than scalars, with the output at a given moment depending on the input past values. For simplicity of description we initially ignore memory, assuming memory-less TCs. The absolute value inside $M(\bullet)$ and $\Phi(\bullet)$ in (0.3) is essential: the magnitude of the output and its phase must be sole functions of the amplitude $|U|$ of the input, $$|V|=|M(|U|)|, \angle V=\Phi(|U|)$$

i.e. the phase $\angle U$ of the input is "erased" or "reset", in the sense of playing no role in determining the amplitude and phase of the output. Therefore all input phasors U, residing on a circle in the complex plane elicit the same response upon propagation through the PE.

We inventively claim that the mathematical cascade of the particular LC (0.1) for a certain range of the coefficients a, b, c, or more restrictively (but simpler to explain) the LC (0.2), along with a fairly general PE (arbitrary $M(\bullet)$ and $\Phi(\bullet)$) indeed functions as a Reconfigurable Logic Gate:

$$V=G_R(X,Y)=e^{j\Phi(X+Y-R)}M(|X+Y-R|) \quad (0.4)$$

The RLG abstract block diagram is shown in FIG. 1 which schematically depicts an abstract mathematical structure of the All-optical Universal Gate, as a cascade of linear combiner and a phase-erasure module according to an exemplary embodiment of the current invention.

The selection of the particular Boolean function (AND/OR/XOR . . . etc.) is effected by the auxiliary input R into the LC, as specified further below.

Binary Complex Alphabet and Logic Polarity

To complete the RLG description we must further specify our assignment of Boolean values (True/False or "Logic 1"/"Logic 0") to the complex-values allowed for the Boolean inputs X, Y and output V of the gate. Our invention provides considerable flexibility, allowing each of these signals to assume any pair of distinct complex values, as long as the assignments are uniquely identified. A generic complex-valued Boolean signal S is assigned a binary complex-valued alphabet $S \in \{S_T, S_F\}$, $S_T = |S_T|e^{j\angle S_T}$, $S_F = |S_F|e^{j\angle S_F}$, We then have the logic assignment $S_T \leftrightarrow T$, $S_F \leftrightarrow F$, which may be changed from one logic signal to the next, in the sense that another logic signal may have associated with it a different pair of complex-values. For the purpose of describing the principle of operation, as well as performing systematic design with these gates, it is worth adopting the "mixed signal convention" [D. Winkel and F. Proser, "The Art of Digital Design", Prentice-Hall, 1980]. In the spirit of that convention, for a given logic signal B, we may freely interchange the order of the two complex signals representing B, in the complex binary alphabet (this amounts to interchanging the T, and F assignments to the two complex scalars). For the purpose of physical implementations, we shall later see that the flexibility in the logic assignment enables meaningfully cascading multiple gates, and changing the devices' logic designations, critical to practical implementation. Let us uniquely label the two signals $S_H$, $S_L$ in the binary complex-valued alphabet, at a given port in the system, by their magnitudes, as Low (L) and High (H), i.e. $|S_L| \leq |S_H|$. In case the magnitudes are equal, we arbitrarily select one of the signals as L, e.g. the one the phase modulo $2\pi$ of which is the lower of the two phases. Otherwise the phase has no bearing on this assignment. In fact any arbitrary unique assignment of the labels L and H to the two phasors might do as well, but it makes the graphic description easier to relate labels L and H to the actual magnitudes. The alphabet is then renamed $\{S_L, S_H\}$ and there are then two possible logic conventions: "positive logic", (T,F)=(H,L), and "negative logic" (T,F)=(L,H). The "logic polarity" (either positive/negative logic) should be specified at every port. E.g. if negative logic is adopted at a port, and $S_L$ occurs there, then we conclude that the logic value of the port is "True". A logic assignment design at a port then involves specifying a pair of complex values (magnitudes and phases), consistent with the physics at that port, and further specifying a "logic polarity". To designate the logic polarity of a signal S we follow the conventions of [D. Winkel and F. Proser, "The Art of Digital Design", Prentice-Hall, 1980], denoting it as S.H (S.L) if the logic polarity is positive (negative).

1.3 Mathematical Description of AND and NOR Gates Principle of Operation

We now show that in principle, under very mild constraints on the logic assignments of the inputs $X \in \{X_T, X_F\}$ and $Y \in \{Y_T, Y_F\}$ and on the memoryless 'magnitude' function M(•), and for a suitable logic assignment $V \in \{V_T, V_F\}$, the TC $G_R(\cdot, \cdot)$ (0.4) realizes a large variety of logic truth tables, hence any device realizing this TC may be considered a reconfigurable logic gate. Assume that X, Y are assigned the same binary complex-valued alphabet $X, Y \in \{E_L, E_H\}$, showing that for appropriate selections of the reference R, (0.4) respectively realizes the truth table of the logic gates ((N)AND,(N)OR, XOR, XNOR).

In the sequel we find it convenient to use the set-theoretic notation of the sum of two sets $A+B=\{a+b|a \in A, b \in B\}$ (i.e. the sum of two sets is obtained by taking all pairs with their first element in the first set and their second element in the second set, and summing up the two elements in each pair) and in the same spirit we further introduced the sum or difference of a set and a scalar as $A \pm s = A \pm \{s\} = \{a \pm s| a \in A\}$, i.e. we add/subtract the scalar to/from each of the elements of the set. Consider first the operation of the gate with the particular reference $$R = R_L \equiv 1.5 E_L + 0.5 E_H \quad (0.5)$$

We next show that under a nominal positive polarity assignment to the inputs X, Y and the output V this particular value of the reference will turn the reconfigurable gate into an AND gate. For the remaining combinations of logic polarities of the inputs and the output, this gate (with the same reference (0.5)) further realizes NAND, OR, or NOR.

We must introduce here to a slight notational complication, which actually simplifies the description: strictly the gates we formally define have X and Y as inputs and V' rather than V as output (V' is the output of the absolute value block in FIG. 1—this is not a physical output but an effective mathematical one, part of the PE nonlinearity. To the extent that M(.) is a monotonically increasing function, or at least if it monotonically increasing just between the two values $U_L, U_H$, i.e. $M(|U_L|) < M(|U_H|)$ then the output V of the PE has the same logic polarity as the intermediate output V'. Else the two signals are logic complements of each other, V=NOT[V']

We make a somewhat odd convention, nevertheless simplifying the overall description, namely that the logic polarity of V is taken as that of V'. This amounts to assigning positive or negative logic at the overall gate output V (the output of the nonlinear PE stage) according to the magnitude of the input U (whether High or Low in magnitude) rather than according to the magnitude of V itself. This somewhat odd convention simplifies the description. Hence, when the output V is said to have positive logic, while assuming that M(.) is monotonically decreasing, then the higher value of V is considered False under this "positive logic" (as the higher value of V corresponds to the lower absolute value of U, which corresponds to False under conventional positive logic at the U point). Therefore, although the actual output of the gate is V, we effectively consider the output to be V', rather than V, when referring to the logic polarity of the output. Technically, it is as if we omitted the prime on all the V-s in the logic equations to follow. Had we not adopted this notational convention, we would have had to effectively insert an additional inverter between V and V', whenever M(.) was monotonically decreasing, and not insert such an inverter whenever M(.) was monotonically increasing, hence the description would have been complicated. We may in fact adopt the rule that whenever M(.) was monotonically decreasing (increasing), we take the logic polarity of the output to be negative (positive), and this way V and V' are logically identical, and then we never need to be concerned about a possible inversion due to the sign of the slope of M(.).

To show that the overall gate truth table is an AND, we substitute (0.5) into (0.2) yielding:

$$U = X + Y - R \in \{E_H, E_L\} + \{E_H, E_L\} - (1.5E_L + 0.5E_H)$$
$$= \{2E_H, E_H + E_L, 2E_L\} - 1.5E_L - 0.5E_H$$
$$= \{1.5E_H - 1.5E_L, 0.5E_H - 0.5E_L, -0.5E_H + 0.5E_L\}$$
$$\equiv \{U_{HH}, U_{HL/LH}, U_{LL}\}$$

(5)

where, denoting the distance between the two states as $d \equiv E_H - E_L$:

$$|U_{HL}| = 1.5|E_H - E_L| = 1.5d$$  (15)

$$|U_{HL/LH}| = 0.5|E_H - E_L| = 0.5d$$

$$|U_{LL}| = -0.5|E_H - E_L| = -0.5d$$

Note that the middle state corresponds to either the H/L or the L/H assignments. This is consistent with the usual set-theoretic convention that duplicate elements of a set are listed as a single element. In detail, either $X=E_H$, $Y=E_L$ or $X=E_L$, $Y=E_H$ yield a common value $U=X+Y-R_L=E_H+E_L-R_L=E_H+E_L-(0.5E_H+1.5E_L)=0.5E_H-0.5E_L=U_{HL/LH}$.

Quite remarkably (0.6) indicates that the LC outputs satisfy $U_{HL/LH}=-U_{LL}$, i.e. $U_{HL/LH}$, $U_{LL}$ are antipodal, having the same absolute value, whereas $U_{HH}$ has an absolute value three times as large: $|U_{HL/LH}|=|U_{LL}|=0.5d$, $|U_{LL}|1.5d$.

This implies that upon passing U through a PE module, which responds to the amplitude of U, while erasing its phase, then $U_{HL/LH}$, $U_{LL}$ (which have the same absolute value) become indistinguishable, such that the inputs HL, LH, LL are all mapped into a common complex-valued output $$V_{LL}=V_{HL/LH}=e^{j\Phi(0.5d)}M(0.5d) \equiv V_{HL/LH/LL}$$

whereas HH is mapped into a second output (distinct from the first output, under mild conditions discussed below): $V_{HH}=e^{j\Phi(1.5d)}M(1.5d)$.

Then, as long as either $M(1.5d) \neq M(0.5d)$ or $\Phi(1.5d) \neq \Phi(0.5d)$ (or both conditions hold), then $V_{HH} \neq V_{HL/LH/LL}$, hence by adopting the output assignment $$\{V_T, V_F\} = \{V_{HH}, V_{HL/LH/LL}\}$$

we have realized a logic gate which may be interpreted as an AND gate, provided that the inputs are also interpreted under positive logic $\{V_{TT}, V_{TF/FT/FF}\} = \{V_{HH}, V_{HL/LH/LL}\}$, as then we have $$\{V_T, V_F\} = \{V_{TT}, V_{TF/FT/FF}\}$$

i.e. TT→T, and TF→F, FT→F, and FF→F, which is the truth table of an AND gate.

Formally, we express the AND operation, with the assumed nominal positive I/O logic, and the reference input $R_L$, as:

$$V \cdot H|_{R_L} = X \cdot H \wedge Y \cdot H$$

(where ∨ denotes logical OR and ∧ denotes logical AND)

The virtual conversion of an AND gate to a logic NAND, OR, or NOR gate, merely by changing the logic polarity assignments of the input and output, is well-known, e.g. [D. Winkel and F. Proser, "The Art of Digital Design", Prentice-Hall, 1980], but notice that we follow a slightly different flavor of the "mixed signal convention" here (in our "mixed-signal" interpretation, the logic function of a certain physical device does change as we switch the logic polarities of its I/O ports)

With the reference (0.5), assuming the inputs retain their positive polarity while the output polarity is inverted to negative polarity, then evidently the AND gate becomes a NAND:

$$V \cdot L|_{R_L} = \overline{V \cdot H}|_{R_L} = \overline{X \cdot H \wedge Y \cdot H} = X \cdot H \text{ NAND } Y \cdot H \quad (0.8)$$

NAND: TT→F, and TF→T, FT→T, and FF→T

Next, setting in both cases negative polarity at the inputs as well as at the output, the gate then switches from an AND to a OR (De-Morgan's rule).

Indeed, setting $X \cdot L = \overline{X \cdot H}$, $Y \cdot L = \overline{Y \cdot H}$, $V \cdot L = \overline{V \cdot H}$ in yields $$V \cdot L|_{R_L} = \overline{X \cdot L} \vee \overline{Y \cdot L} = \overline{X \cdot L \wedge Y \cdot L} = X \cdot L \text{ NAND } Y \cdot L$$

$$V \cdot L|_{R_L} = \overline{V \cdot H}|_{R_L} = \overline{\overline{X \cdot L} \wedge \overline{Y \cdot L}} = X \cdot L \vee Y \cdot L = X \cdot L \text{ OR } Y \cdot L$$

OR: FF→F, and FT→T, TF→T, and TT→T

Next, setting negative polarity at the inputs and positive polarity at the output, the gate then implements a NOR $$V \cdot H|_{R_L} = \overline{\overline{X \cdot L} \wedge \overline{Y \cdot L}} = \overline{X \cdot L \vee Y \cdot L} = X \cdot L \text{ NOR } Y \cdot L$$

NOR: FF→T, and FT→F, TF→F, and TT→F

Graphic Description of the Principle of Operation of the AND and NOR Gates

Figure 2:
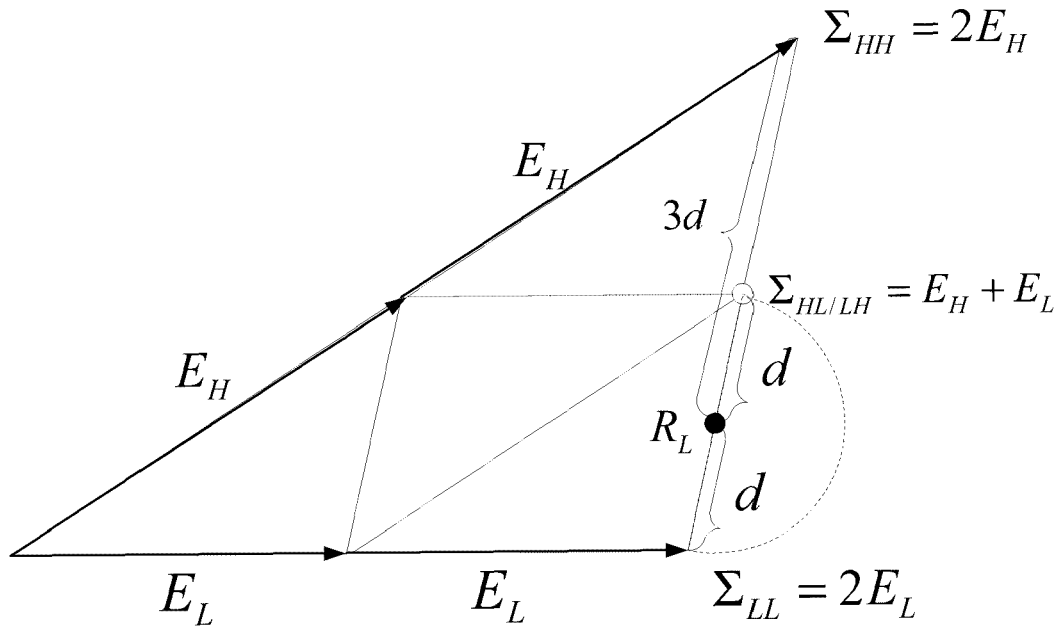
FIG. 2. Schematically depicts a nominal AND gate (under positive logic polarity) according to an exemplary embodiment of the current invention.

FIG. 2 illustrates the AND gate operation using graphic addition of vectors by the parallelogram rule. This alternative graphic point of view is very useful, as it provides intuition into the gate operation and allows understanding how the gate may be reconfigured by means of modifying its reference input. We recast the LC (0.2) as an adder (of the two inputs) followed by a subtractor (of the reference):

$$\Sigma \equiv X + Y \quad (0.9)$$

$$U = \Sigma - R$$

where $\Sigma \in \{\Sigma_{HH}, \Sigma_{HL/LH}, \Sigma_{LL}\} = \{2E_H, E_H+E_L, 2E_L\}$.

It is then evident, both graphically and analytically, that $\Sigma_{HL/LH} = (\Sigma_{HH} + \Sigma_{LL})/2$, i.e. the tip of the phasor $\Sigma_{HL/LH}$ is the midpoint of the segment connecting the tips of the phasors $\Sigma_{HH}, \Sigma_{LL}$. For nominal AND operation, R as given by (0.5) is located at the midpoint of the segment connecting the tips of $\Sigma_{HL/LH}, \Sigma_{LL}$, as is readily verified:

$$\frac{\Sigma_{HL/LH} + \Sigma_{LL}}{2} = \frac{(E_H + E_L) + 2E_L}{2} = 0.5E_H + 1.5E_L = R_L$$

Now, the generation of $U = \Sigma - R$ as the difference between $\Sigma$ and R is graphically viewed as changing the origin of the complex plane to the location of the point R. As the PE module following the LC only responds to the magnitude of the U input, all that matters are the lengths of the radii of circles $|U| = |\Sigma - R|$ with center R, passing through the various points $\Sigma_{HH}, \Sigma_{HL/LH}, \Sigma_{LL}$ (these points are relabeled $U_{HH}, U_{HL/LH}, U_{LL}$ in the coordinate system centered at R). We note that $$|\Sigma_{HH} - \Sigma_{LL}| = |2E_H - 2E_L| = 2|E_H - E_L| = 2d,$$

$$|\Sigma_{HH} - \Sigma_{LL}| = |\Sigma_{HH} - \Sigma_{HL/LH}| = d$$

Given the construction above, it is readily seen that $U_{HL/LH}$, $U_{LL}$ are on a circle of radius 0.5d, centered on the "origin", R, whereas $U_{HH}$ is on a circle of radius 1.5d. The PE then maps both $U_{HL/LH}, U_{LL}$ which are on the same circle of radius 0.5d into the complex output $e^{j\Phi(0.5d)}$M (0.5d), whereas $U_{HH}$, which resides on a larger circle of radius 1.5d, is mapped into the distinct complex output $e^{j\Phi(1.5d)}$M(1.5d).

Notice that the fact that for the fixed setting (0.5) all four gates, (N)AND/(N)OR, may be realized by changing the polarities of the I/O ports, may not be construed as meaning that the gate is reconfigurable. Indeed, to physically modify, say an AND gate into an OR one, additional physical inverter devices must be inserted into all I/O ports. Nevertheless, there is a way to physically reprogram an AND gate to become a NOR gate, without switching in inverters, while retaining the same positive logic polarity, just by switching the reference input to a new value:

$$R = R_H \equiv 0.5 E_L + 1.5 E_H \tag{0.10}$$

Note: the designations $R_H$, $R_L$ in the last equation and (0.5), correspond to the reference weighting more the High value, $E_H$, or the low value $E_L$ The proof is provided further below, where it is shown $$V \cdot H |_{R_H} = \overline{X \cdot H} \vee \overline{Y \cdot H}, \tag{0.11}$$

(where ∨ denotes logical OR and ∧ denotes logical AND) but let us first determine the functionality of this same physical gate under alternative input and output assignments.

With this reference, assuming the inputs retain their positive polarity while the output polarity is inverted to negative polarity, then evidently the NOR gate becomes an OR. In other words, upon switching the reference from $R_L$ to $R_H$ while setting in both cases positive polarity at the inputs and negative polarity at the output, the gate then switches from a NAND to an OR:

$$\overline{V \cdot L}|_{R_H} = \overline{V \cdot H}|_{R_H} = \overline{\overline{X \cdot H} \vee \overline{Y \cdot H}} = X \cdot H \vee Y \cdot H \tag{0.12}$$

Next, upon switching the reference from $R_L$ to $R_H$ while setting in both cases negative polarity at the inputs and inverted polarity at the output, the gate then switches from an OR to a NAND. Indeed, setting $X \cdot L = \overline{X \cdot H}, Y \cdot L = \overline{Y \cdot H}$ in (0.12) yields $$\overline{V \cdot L}|_{R_H} = \overline{X \cdot L} \vee \overline{Y \cdot L} = \overline{X \cdot L \wedge Y \cdot L} = X \cdot L \ NAND \ Y \cdot L$$

Next, upon switching the reference from $R_{AND}$ to $R_H$ while setting in both cases negative polarity at the inputs and straight polarity at the output, the gate then switches from a NOR to an AND.

$$V \cdot H|_{R_H} = \overline{\overline{X \cdot L} \vee \overline{X \cdot L}} = \overline{\overline{X \cdot L}} \wedge \overline{\overline{Y \cdot L}} = X \cdot L \wedge Y \cdot L$$

We summarize the reconfigurability upon switching the reference from $R_L$ to $R_H$, as follows: AND→NOR, NAND→OR, OR→NAND, NOR→AND It remains now to show that the gate $R_H$, with nominal positive logic polarity indeed functions as a NOR gate.

Figure 3:
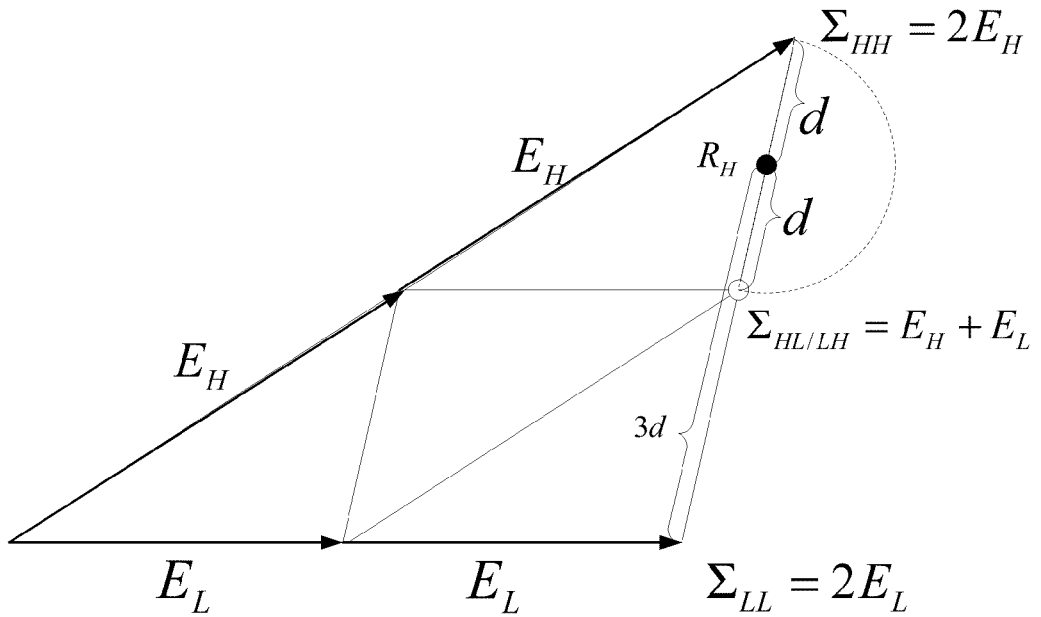
FIG. 3. Schematically depicts a nominal NOR gate (under positive logic polarity) according to an exemplary embodiment of the current invention.

FIG. 3 schematically depicts a nominal NOR gate (under positive logic polarity) according to an exemplary embodiment of the current invention.

Examining the desired NOR truth table,

NOR: FF→T, FT→F, TF→F, TT→F, it is observed that it is now the input pairs TT,TF,FT that are mapped into a single logic output, F, whereas the remaining pair FF is mapped into its complementary output, T. We then need to render indistinguishable the input pairs TT,TF, FT corresponding in the positive input logic to the field levels HH, HL,LH, or $\{\Sigma_{HH}, \Sigma_{HL/LH}\} = \{2E_H, E_H + E_F\}$ We then select the reference R midway between these two points in the complex plane, setting $$R_H = \frac{\Sigma_{HH} + \Sigma_{HL/LH}}{2} = 1.5 E_H + 0.5 E_L$$

which is consistent with (0.10). Viewed from R, the points corresponding to HH and HL/LH are then all on the same circle of radius 0.5d (since the segment connecting $\Sigma_{HH}$, $\Sigma_{HL/LH}$ is of length d, half the length of the segment of length 2d connecting $\Sigma_{LL}, \Sigma_{HH}$).

To summarize the operation of the nominal NOR gate (FIG. 3), the four input combinations, HH, HL,LH, LL to be are mapped into two output logic values, with the first three HH, HL,LH grouped into one value, and the remaining one LL, grouped into another value. Notice that the adder subblock of the LC maps the triplet HH, HL,LH into $\Sigma_{HH}$, $\Sigma_{HL/LH}, \Sigma_{LL}$, where due to the commutativity of field addition, the states HL,LH are not distinguishable in terms of the Σ they generate. At this point, the first two field values $\Sigma_{HH}, \Sigma_{HL/LH}$ now represent the three input logic states HH, HL,LH. Now in the NOR gate, it is these three states that must be all mapped into a single quantity, and since these three logic states correspond to just two phasors, $\Sigma_{HH}, \Sigma_{HL/LH}$, then it is these two phasors that must be mapped into a single output analog value, achieved by setting the reference at the center of gravity of these two fields, such that the two points $\Sigma_{HH}, \Sigma_{HL/LH}$ are equidistant from R, hence the two value of U, have the same magnitude $|U_{HH}| = |U_{HL/LH}|$, implying that at the output of the PE a single value is obtained for HH, HL,LH, LL, while a distinct value is obtained for LL, as $U_{HH}$ is further away from R. The principle of operation just described for the AND gate is really identical to that of the AND gate first introduced. The difference is that in the case of the AND gate, out of the four input combinations, HH, HL,LH, LL it is the last three, HL,LH, LL (rather than the first three), that must be mapped into a single value. Again, the addition, Σ, maps these three values into two fields labeled here HL/LH, LL, and to make all three combinations HL,LH, LL indistinguishable, the two phasors, HL/LH, LL, must be rendered indistinguishable, achieved by setting R at the center of gravity of HL/LH, LL, such that R is equidistant from HL/LH, LL, i.e. in sloppy notation, |HL/LH|=|LL|. Hence, the difference between the nominal AND and nominal NOR gates is that in one case the reference is located at the midpoint of HH and HL/LH (i.e. three quarters of the way from LL to HH), whereas in the other case the reference is located at the midpoint of LL and HL/LH (i.e. one quarters of the way from LL to HH). The reference is always located at the midpoint of the segment the two ends of which represent the three input states to be identified.

XOR and XNOR Gates Principle of Operation

Figure 4:
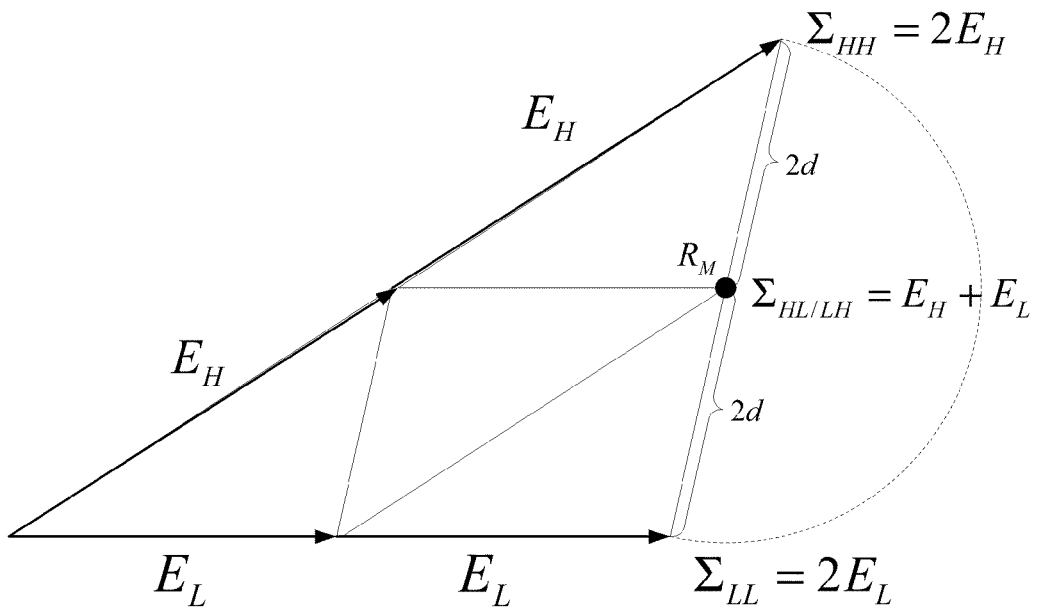
FIG. 4. Schematically depicts a nominal XOR gate (under positive logic polarity) according to an exemplary embodiment of the current invention.

FIG. 4 schematically depicts a nominal XOR gate (under positive logic polarity) according to an exemplary embodiment of the current invention.

The description above alludes to how the system should be modified to implement the XOR and XNOR (Coincidence) truth tables (FIG. 4). These are truth tables, not distinguishing between the states TT, FF (i.e. assigning a single logical output value to TT,FF, namely (F for XOR, T for XNOR), whereas the states TF,FT are assigned the complementary value (T for XOR, F for XNOR). As it is TT and FF that are now indistinguishable, we select R midway between the two complex-plane points $\{\Sigma_{HH}, \Sigma_{LL}\}=\{2E_H, 2E_L\}$:

$$R_M = \frac{\Sigma_{HH} + \Sigma_{LL}}{2} = E_H + E_L = \Sigma_{HL/LH},$$

hence $R_M$ coincides with $\Sigma_{HL/LH}$. Then $$U = \Sigma - R_M$$
$$= \{\Sigma_{HH}, \Sigma_{HL/LH}, \Sigma_{LL}\} - \Sigma_{HL/LH}$$
$$= \{\Sigma_{HH} - \Sigma_{HL/LH}, 0, \Sigma_{LL} - \Sigma_{HL/LH}\}$$
$$= \{E_L + E_H, 0, -(E_L + E_H)\}$$

hence $U=\{d,0,-d\}$ where $d=|E_H-E_L|$

It follows that $V=e^{j\Phi(|U|)}M(|U|)=\{e^{j\Phi(d)}M(d), e\ e^{j\Phi(0)}M(0),e^{j\Phi(d)}M(d)\}$ i.e.

$$V \in \{e^{j\Phi(d)}M(d), e\ e^{j\Phi(0)}M(0)\}$$

or $$V_{HH}=V_{LL}=e^{j\Phi(d)}M(d),\ V_{HL/LH}=e^{j\Phi(0)}M(0)$$

Reversing the logic assignment, i.e. taking $$V \in \{e^{j\Phi(0)}M(0),e^{j\Phi(d)}M(d)\}$$

we obtain $\text{XNOR}=\overline{\text{XOR}}$.

Graphic Overview and Comparison of all Gates

To summarize the three possible positions of the reference $R_L$, $R_M$, $R_H$, the following five points are equally spaced along a segment in the complex plane: $\{U_L, R_L, R_M=U_{LH/HL}, R_H, U_H\}$, at distances d/2 between any two adjacent points (FIGS. 1-3). The selection $R_L$ renders indistinguishable its neighboring points, $U_L$, $U_{LH/HL}$, the selection $R_H$ renders indistinguishable its neighboring points, $U_{LH/HL}$, $U_H$, and the mid selection $R_H$ renders indistinguishable $U_L$, $U_H$, which are equidistant from it (LH, HL are already indistinguishable in $U_{LH/HL}$).

We should make the point that the mid-segment positions described for the references $R_L$, $R_M$, $R_H$ are not the only ones possible, in fact $R_L$ may be located anywhere along the perpendicular bisector of the segment [$U_L$, $U_{LH/HL}$] (such that it is equidistant from these two points), $R_H$ may be located anywhere along the perpendicular bisector of the segment [$U_{LH/HL}$, $U_H$], whereas $R_M$ may be located anywhere along the perpendicular bisector of the full segment [$U_L$, $U_H$]. However, if we account for noise and other deviations and fluctuations, it is evident that we wish to maximize the difference between the Low and High output levels, and it is seen that the optimal points attaining maximal discrimination between the Low and the High are right at the intersections of these perpendicular bisectors with the segment [$U_L$, $U_H$], i.e. at the original locations we discussed. Still in the spirit of maximizing the discrimination between Low and High levels at the gate output, we have (to some extent) another degree of freedom, in selecting the phases of $E_L$, $E_H$ such that the distance $d \equiv |E_H-E_L|$ is maximized.

Once d is maximized, then since for the (N)AND/(N)OR gates (realized with $R_L$, $R_H$) the L and H values for U are 0.5d and 1.5d, then the difference of these two values is only maximized. For the X(N)OR gates the L and H values for U are 0 and 2d, then evidently the discrimination between L and H at the input U, and hence at the output V of the PE, is going to be maximized by maximizing d.

Antipodal Binary Alphabets

For fixed specified powers of the logic inputs $P_{L/H} \equiv |E_{L/H}|^2$ the optimal selection of the phases $\angle E_L$, $\angle E_H$ is the antipodal one, $\angle E_L = \angle E_H+\pi$. Without loss of generality we may then select $\angle E_H=0$, then $\angle E_L=\pi$, i.e. both phasors $E_L$, $E_H$ are real valued with $E_L<0<E_H$.

Now, if we wish to minimize the average input power $\langle P_{In} \rangle=(P_L+P_H)/2$ while retaining a fixed d, we select the two inputs as antipodal, $E_L=-E_H$ (if control over the inputs is available). Conversely, for an input average power constraint, $\langle P_{In} \rangle<P$, the distance discrimination is maximized by selecting the two inputs as antipodal.

For antipodal (bipolar) real-valued inputs, $\{-A, A\}$ the distance parameter becomes $d=2A$ and the relevant five phasors become $$\{U_L,R_L,R_M=U_{LH/HL},R_H,U_H\}_{bipolar}=\{-2A,-A,0,A,2A\}. \quad (0.13)$$

As particular examples, we review the operation of the AND, NOR and XOR gates with antipodal signaling, i.e. with bipolar inputs X, Y=±A. Hence $\Sigma=\pm A\pm A \in \{-2A, 0, 2A\}$ with the midvalue 0, corresponding to the LH and HL whereas $-2A$ and $2A$ respectively correspond to LL and HH.

AND gate: Subtracting the reference $R_L=-A$ amounts to right-shifting the "logic constellation" $\{-2A, 0, 2A\}$ by A, yielding $U \in \{-A, A, 3A\}$. The lowest two values, $-A, A$ (representing LL, LH/HL) are next made to merge by taking the absolute value, yielding $V' \in \{A, 3A\}$.

NOR gate: Subtracting the reference $R_L=A$ amounts to left-shifting the "logic constellation" $\{-2A, 0, 2A\}$ by A, yielding $U \in \{-3A, -A, A\}$. The highest two values, $-A, A$ (representing LH/HL,HH) are next made to coalesce by taking the absolute value, yielding $V' \in \{3A, A\}$.

XOR gate: Here the reference is $R_L=0$, i.e. the output logic constellation remains $U \in \{-2A, 0, 2A\}$, with the three values respectively corresponding to LL, LH/HL and HH. The two LL and HH values ±2A are made to coalesce by taking the absolute value: $V' \in \{2A, 0\}$ Another operational regime to be considered (although it is not most efficient in power) is the unipolar one, whereby the LOW input is zero. Still taking the signals as real-valued without loss of generality, we may obtain all signals by a 2A shift of the bipolar signals in (0.13):

$$\{U_L,R_L,R_M=U_{LH/HL},R_H,U_H\}_{unipolar}=\{0,A,2A,3A,4A\}. \quad (0.14)$$

1.4 Unipolar Binary Alphabets

It is also of interest to consider the unipolar binary input alphabet, X, Y∈{0, A}, yielding $\Sigma=0\backslash A+0\backslash A=0\backslash A\backslash 2A$ (where the \ notation means "or") at the $\Sigma$ output of the first coupler. The lowest two values 0, A (representing LL, LH/HL) are next made to merge by subtracting a reference half-way between them by means of the second coupler and then taking the absolute value: $U=-A/2\backslash A/2\backslash 1.5A$, and $V'=|U|=A/2\backslash 3A/2$.

1.5 Single-Gate Impairments

We now consider imperfections: slight errors in the inputs and imperfect linear combination coefficients in the linear part of the gate (the LC). Assume first a perfect gate but imperfect inputs. We have seen that we have leeway to work with any binary complex alphabet $\{E_L, E_H\}$ for the low and high inputs, although there is preference for having the two inputs as far away in distance as possible, while retaining as low average power as possible, which may be achieved by approximating more closely the antipodal alphabet, $\{-A, A\}$. However, deviation from the antipodal alphabet will not be considered a major imperfection, as the gate still operates as advertised with any alphabet, though its energy efficiency and noise discrimination may somewhat be impaired. A more serious impairment occurs when the two alphabets at the two input ports are not identical, $\{E_L^X, E_H^X\} \neq \{E_L^Y, E_H^Y\}$. In other words, we now have two slightly different values $E_L^X, E_L^Y$ for the LOW state, and likewise two different values $E_H^X, E_H^Y$ for the HIGH state. It is useful to express the values in each pair in terms of their common and difference modes (their average and half their difference):

$$(E_L^X, E_L^Y) = \overline{E}_L \pm \overline{E}_L^\Delta, (E_H^X, E_H^Y) = \overline{E}_H \pm \overline{E}_H^\Delta$$

Then, the LL inputs map into $\Sigma_L = E_L^X + E_L^Y = 2\overline{E}_L$ (rather than the ideal $\Sigma_L = 2E_L$), the HH inputs map into $\Sigma_H = E_H^X + E_H^Y = 2\overline{E}_H$ (rather than the ideal $\Sigma_H = 2E_H$) and the LH/HL respective inputs map into two separate phasors:

$$\Sigma_{LH} = E_L^X + E_H^Y = (\overline{E}_L - \overline{E}_L^\Delta) + (\overline{E}_H + \overline{E}_H^\Delta) = \overline{E}_L + \overline{E}_H + \overline{E}_{H\Delta} - \overline{E}_L^\Delta$$

and $$\Sigma_{HL} = E_H^X + E_L^Y = (\overline{E}_H - \overline{E}_H^\Delta) + (\overline{E}_L + \overline{E}_L^\Delta) = \overline{E}_H + \overline{E}_L - \overline{E}_{H\Delta} + \overline{E}_L^\Delta$$

i.e. $\Sigma_{LH} \neq \Sigma_{LH}$ rather than having a single ideal value $\Sigma_{HL/LH} = E_L + E_H$). The average (center of gravity) of these two "mid" values is exactly the center of gravity of $\Sigma_H, \Sigma_L$:

$$\Sigma_{HL/LH} \equiv \frac{\Sigma_{HL} + \Sigma_{LH}}{2} = \overline{E}_H + \overline{E}_L = \frac{\Sigma_H + \Sigma_L}{2}$$

Their separation (half-distance) is precisely the difference between the deviations with the H pair and the L pair:

$$\Sigma_{HL/LH}^\Delta \equiv \frac{\Sigma_{HL} - \Sigma_{LH}}{2} = \overline{E}_L^\Delta - \overline{E}_H^\Delta$$

The odds are small that $\Sigma_{HL/LH}^\Delta$ become zero in the case when we have two different LOW/HIGH values at the two inputs, rather than a common value of LOW and a common value of HIGH. This may nevertheless occur if the deviations between the two values at the two inputs just happen to be equal: $\overline{E}_{H\Delta} = \overline{E}_L^\Delta$, however for random deviations this is highly unlikely, hence practically we end up with a split of the ideal mid value into two different ones, $\Sigma_{HL} \neq \Sigma_{LH}$.

Recall that $R_L$ for the nominal AND gate was positioned half-way between $\Sigma_{HL/LH}$ and $\Sigma_L$, and similarly $R_H$ for the nominal NOR gate was positioned half-way between $\Sigma_{HL/LH}$ and $\Sigma_H$. Considering for definiteness the nominal AND gate with reference $R_L$ (the treatment of the other gate types is similar), the fact that the common phasor $\Sigma_{HL/LH}$ is now split into two separate phasors $\Sigma_{HL}, \Sigma_{LH}$ means that the ideally common distance $|\Sigma_{LL} - R_L| = |\Sigma_{HL/LH} - R_L|$ is now split into three slightly different distances $|\Sigma_{HL} - R_L|, |\Sigma_{LL} - R_L|, |\Sigma_{LH} - R_L|$, and we should strive to select our reference $R_L$ such that these three distances get equal or nearly equal, subject to some other constraints. The remaining distance, $|\Sigma_{HH} - R_L|$ is substantially larger (about three times as large) than the three nearly equal distances mentioned above. Theoretically, there is a selection of $R_L$ that makes the three distances $|\Sigma_{HL} - R_L|$, $|\Sigma_{LL} - R_L|, |\Sigma_{LH} - R_L|$: The reference should be selected as the center of gravity of the three points $\Sigma_{HL}, \Sigma_{LL}, \Sigma_{LH}$, i.e. the center of the circle subscribing the triangle $\Sigma_{HL}, \Sigma_{LL}, \Sigma_{LH}$. A geometric construction to obtain the point $R_L$ consists of drawing the perpendicular bisectors of any two sides of the triangle $\Sigma_{HL}, \Sigma_{LL}, \Sigma_{LH}$. The point of intersection of the bisectors is $R_L$. Now depending on the random positioning assumed by the three points $\Sigma_{HL}, \Sigma_{LL}, \Sigma_{LH}$, this theoretical geometrical construction may yield a reference $R_L$ which may deviate much from the ideal position of $R_L$ one quarter of the way along the segment $\Sigma_{LL}, \Sigma_{HH}$. In this case the distance $|\Sigma_{HH} - R_L|$ may not differ much from the common distances $|\Sigma_{HL} - R_L| = |\Sigma_{LL} - R_L| = |\Sigma_{LH} - R_L|$, hence the noise discrimination of the gate may be impaired. This indicates that it may be worth giving up on the requirement that all three distances $|\Sigma_{HL} - R_L|, |\Sigma_{LL} - R_L|, |\Sigma_{LH} - R_L|$ be equal. E.g. we may set either $|\Sigma_{HL} - R_L| \approx |\Sigma_{LL} - R_L| = |\Sigma_{LH} - R_L|$, or $|\Sigma_{HL} - R_L| = |\Sigma_{LL} - R_L| \approx |\Sigma_{LH} - R_L|$.

Actually, it is not strictly necessary to set even a single perfect equality by means of the selection of $R_L$, but we may also set as close an equality as possible for all three terms $|\Sigma_{HL} - R_L| \approx |\Sigma_{LL} - R_L| \approx |\Sigma_{LH} - R_L|$, which may provide a better overall tradeoff between the three e.g. we select $R_L$ such that the two mutual deviations are small and roughly balanced, even though neither is perfectly zero. This assumes that there is a calibration & tuning means provided to measure $\Sigma_{LL}, \Sigma_{HL}, \Sigma_{LH}, \Sigma_{HH}$ as discussed further below. A reasonable selection (minimizing the mean square deviation) is $$R_H = \frac{\Sigma_{LL} + \Sigma_{HL/LH}}{2}$$

Recalling that these distances solely determine output of the PE stage, we then have $$|\Sigma_{HL} - R_L| \approx |\Sigma_{LL} - R_L| \approx |\Sigma_{LH} - R_L|$$

mapping into $V_{HL} = M(|\Sigma_{HL} - R_L|) \approx V_{LL}(|\Sigma_{LL} - R_L|) \approx V_{LH} = M(|\Sigma_{LH} - R_L|)$ Nominally, the three magnitudes $V_{HL}, V_{LL}, V_{LH}$ should have coincided whereas $V_{HH}$ is well separated (recall that we treat here AND gate under positive logic). Now, the three values $V_{HL}, V_{LL}, V_{LH}$ no longer necessarily coincide.

1.6 Linear Combiner Impairments

Next we consider the fact that ideally the linear-front-end (LC) implements $U = X + Y - R$, but in practice we may have instead a linear combination $U = aX + bY + cR$ of X, Y, R, with coefficients not precisely in the ratio $1:1:-1$, but slightly off. It is next shown that any deviations of the a, b and c coefficients from their nominal values $a = b = -c = 1/\sqrt{2}$ (corresponding to implementation with lossless normalized Hadamard matrices—ideal couplers), may be effectively absorbed into the inputs X, Y and the reference, R:

$$U = aX + bY + cR = a(X + (b/a)Y - (-c/a)R) = a(X + Y' - R')$$

where
$X' \equiv X; Y' \equiv (b/a)Y; R' \equiv (-c/a)R$

E.g. suppose that X and Y ideally share the same binary complex alphabet, X',Y' will no longer do, since the alphabet for Y is scaled by the factor (b/a), whereas the alphabet for X is unscaled. Hence any system with imperfect "taps" (the a,b,c coefficients) is indistinguishable from a system with ideal taps but having modified input alphabets, meaning different input alphabets are associated with the two respective input ports, which is a situation already discussed above.

The all-optical logic gates are dual-input single-output optical devices with "analog" (optical) inputs and outputs (henceforth referred to as ports). In this section we treat the "analog" signals abstractly, mathematically, however in the preferred embodiments they are optical (though applications to other physical media may also be possible). Let the inputs to a logic gate device be denoted $\underline{X}$, $\underline{Y}$ (these are complex amplitudes of the input field) and the output $\underline{Y}$. The analog optical values $\underline{X}$, $\underline{Y}$ representing the Boolean input variables X,Y may have small variations, each fluctuating over a nominal domain in the complex plane, with the requirement that the two input domains, corresponding to the Logical True and False be disjoint. A necessary condition for a gate or cascade of gates to be valid is that the output ranges of the High and Low values be disjoint.

1.7 LC Conceptual Realization as Cascade of Two Lossless Transformations

Optical realizations of the signed addition U=X+Y−R, will be discussed in the next section. Here we mathematically abstract the lightwave implementations discussed in the next section, as a cascade of two lossless unitary transformations. In particular, let us assume that we have access to a so-called Hadamard transformation $$\begin{bmatrix} \Sigma \\ \Delta \end{bmatrix} = \begin{pmatrix} 1 & 1 \\ 1 & -1 \end{pmatrix} \begin{bmatrix} X \\ Y \end{bmatrix} = H \begin{bmatrix} X \\ Y \end{bmatrix} =$$

where H is the Hadamard matrix of order 2, such that one output is the sum of the two inputs while the second output is the difference of the two inputs: $\Sigma=X+Y$, $\Delta=X-Y$. We discard the $\Delta$ output and feed the $\Sigma$ output into a second Hamard gate with inputs $[\Sigma, R]^T$ this time discarding the top (sum) output of the second Hadamard transformation, while retaining the bottom (difference) output, yielding $$U=\Sigma-R=X+Y-R$$

A modified version of the Hadamard matrix, scaled by $1/\sqrt{2}$, $$\hat{H} = \frac{1}{\sqrt{2}} \begin{pmatrix} 1 & 1 \\ 1 & -1 \end{pmatrix}$$

corresponds to a lossless device, to be realized as an optical directional coupler in the next section.

Notice that losslessness is specified over the vectors comprising both ports (the energy of the input vector equals the energy of the output vector).

Note: Any result obtained using the unnormalized version of the Hadamard transformation, is simply scaled by $1/\sqrt{2}$ in order to obtain the corresponding normalized Hadamard transformation result.

Multiple Gates Cascadability

Having considered imperfections of the gates inputs and of the linear combiner (which induce imperfections in the outputs, in turn acting as the inputs of the following gates), we now consider what additional requirements must be imposed on the nonlinear PE stage in order to aid the cascadability of the gates. We have shown above that any phase-erasing characteristic $V=e^{j\Phi(|U|)}M(|U|)$ does the job, completing the LC stage to a full functioning logic gate. However, small imbalances of the input levels (binary complex alphabets at the two inputs that are slightly modified) lead to splitting of output values into multiple values, i.e. the HIGH and/or LOW values at the output tends to get "smeared" into multiple discrete values. Moreover, considering small variations in the LC taps and in the input alphabets, the discrete values may occupy small ranges of values. Hence, the two logic outputs are no longer two discrete values but two discrete ranges. E.g. for a nominal AND gate the nominal output $V_L$ is split among the three values $V_{HL}, V_{LL}, V_{LH}$, each of which has its uncertainty. Granted, the union of the three ranges of these three "finely split" values may be well disjoint from the range of values $V_H$, i.e. a single gate may function perfectly, but considering the cascading (chaining and fan-out) of multiple gates, the deviations of each gate tend to compound, until the logic output physical ranges are no longer disjoint, at which point the all-optical logic circuit fails.

We advocate Calibration and Tuning (C&T) mechanisms to monitor the linear part of each gate (the LC) and tune its reference R such that it is optimally placed to effect as close bunching as possible within each group of ideally indistinguishable levels. We should then monitor the signals and apply active controls to attempt to reduce the physical ranges of the output logic signals of each gate. In so doing, we then improve the length of the gates cascade.

E.g. for a chain of XOR gates, the output levels corresponding to HL and LH should be bunched as closely as possible by the C&T mechanism (ideally they should be coalesced into one level) while the output levels corresponding to HH and LL should also be bunched together as closely as possible (ideally they are one level), while maintaining reasonable discrimination between the magnitudes corresponding to the H and L logic values.

Just how many stages of cascading of multiple gates (and their fan-out) are feasible may be determined by an error propagation analysis, working out the error accumulation over a chain of gates, in order to determine how long a chain (or a fan-out tree) is feasible, hence the amount of feasible integration. So far we have allowed arbitrary PE characteristic, as long as it erases the phase. However as is well-known in digital electronics (e.g. CMOS ASICs) the non-linear transfer characteristic of the gate ought to have steep transitions and be flat outside the transitions. The crafting of the PE characteristic to attain best cascadability is discussed next.

1.8 Logic Level Restoration—Ideal Switching Characteristic

Ideally, in order to obtain attain cascadability of gates (still considering the AND gate example for definiteness) all three split LOW values should be mapped into a single logical value (F for the AND gate with positive logic). Actually a similar situation occurs in electronic digital logic, wherein F and T are represented as HIGH and LOW voltages (or vice versa) but HIGH/LOW means two ranges of voltages rather than particular values, provided that these ranges are well separated, to prevent errors due to noise spikes. We recall that the non-linear switching behavior of transistors is used in order to reduce the impact of the variations of the HIGH and LOW over their respective (disjoint) voltage ranges.

An important enabler for the cascadability of the all-optical logic devices is then the property of Logic-Level Restoration: The gate output should have less variation than the analog representations of the Boolean inputs—ideally the analog output should be constant in the wake of small variations of the inputs in their respective nominal ranges. To attain Logic-Level Restoration, the transfer characteristic $\underline{V}=G[\underline{X}, \underline{Y}]$ should have abrupt transitions between the LOW and HIGH input states, and should be flat over the domains of the inputs outside the transition, providing tolerance in the wake of small deviations in the input signal levels. Then, the relatively narrow ranges resulting for the LOW and HIGH outputs may be used as well-conditioned inputs to the next gate, curbing error accumulation and allowing cascadability.

The ideal solution is to have the PE nonlinear characteristic further endowed with a limiter or ideal-switching amplitude transfer characteristic:

$$M(u) = \begin{cases} V_L, & u \leq u_{th} \\ V_H, & u > u_{th} \end{cases}$$

Note: An inverted amplitude transfer characteristic:

$$M(u) = \begin{cases} V_L, & u \geq u_{th} \\ V_H, & u < u_{th} \end{cases}$$

would also be acceptable.

Then, for the AND example, as long as $|U_{HL}|$, $|U_{LL}|$, $|U_H| < u_{th}$, while $u_{th} < |U_{HH}|$, the first three values precisely map into $V_L$, i.e. $M(|U_{HL}|) = M(|U_{LL}|) = M(|U_{LH}|) = V_L$, whereas $M(|U_{HH}|) = V_H$.

Granted, we might not to have a perfect limiter; in fact a finite slope of the high and low branches of the limiter characteristic may still be acceptable, as long as it provides some "compression" of the deviations between the three levels $|U_{HL}|$, $|U_{LL}|$, $|U_H|$ that should ideally coincide. The smaller the slopes of the two limiter branches, the more precise the gate operation, as the distances between $V_{HL}$, $V_{LL}$, $V_{LH}$ get well compressed, becoming practically indistinguishable. If there are small deviations remaining i.e. the output ranges are (small but) finite, rather than consisting of two discrete values $V_L$, $V_H$, then limited cascadability might still be possible.

To substantially increase the length of all-optical logic cascades, it is highly desirable to insert, at least every few gates if not in every gate, high quality switching characteristics effecting restoration of the logic signals. Ideally the PE in each gate should be realized as a high quality limiter, although, if such limiters are scarce resources, we may have them combined with the PE every few gates rather than every gate.

1.9 Conceptual Realization of the PE by Phase Rotation

One possible conceptual realization of the PE may be provided by phase measurement and rotation. Suppose we measure (or have a-priori knowledge of) the phase $\angle U$ of U, and we further have access to a phase-modulator (PM) defined as a device with I/O characteristic $V = e^{j\Phi} U$, where $\Phi$ is the control input. The PE then simply consists of the PM, with the LC output U taken as its input, and we apply the negative of the phase of U to the PM, yielding $V = e^{-j\angle U} U = e^{-j\angle U} e^{j\angle} |U| = |U|$, i.e. the output of the PM yields the absolute value of the input, which is the simplest possible PE characteristic. It remains to explain how the angle of $\angle U$ may be measured. This may be affected by conventional I&Q (In-phase and quadrature) demodulation techniques, passing the I&Q components through an arctan non-linearity. However, phase measurement seems to be a difficult operation (and may be accompanied by noise if the signals are noisy) hence we next show an ingenious alternative scheme that determines the phase of the LC output signal U without measurement, using instead the full correlation between the phase of U and the output of an unused output port of the linear combiner.

For definiteness we consider the case of antipodal signaling and an AND gate—the NOR and XOR gates may be similarly treated.

Hence, in the antipodal case, i.e. when the input alphabet to the gate is X, Y=±A then $$\begin{bmatrix} \Sigma \\ \Delta \end{bmatrix} = \begin{pmatrix} 1 & 1 \\ 1 & -1 \end{pmatrix} \begin{bmatrix} \pm A \\ \pm A \end{bmatrix}$$

where $\Sigma = \pm A \pm A \in \{-2A, 0, 2A\}$ with the midvalue 0, corresponding to the LH and HL whereas $-2A$ and $2A$ respectively correspond to LL and HH. Since the input vector energy (squared norm) is constant, $2A^2$, the two outputs are complementary in energy $|\Sigma|^2 + |\Delta|^2 = 2A^2$. Consider for definiteness an AND gate (the NOR gate is similarly treated), for which we recall that we subtract the reference $R_L = -A$, amounting to right-shifting the "logic constellation" $\{-2A, 0, 2A\}$ by A, yielding $U \in \{-A, A, 3A\}$. The lowest two values, $-A, A$ (representing LL, LH/HL) should be next made to coalesce, in effect taking the absolute value. In the phase-rotation implementation, this is realized by applying a 180 deg phase rotation when the mid-value A occurs. How do we know when that is the case (without measuring the phase, and also discriminating between the cases when U equals A vs. U equals 3A)? To this end we resort to the unused port $\Delta = \pm A - (\pm A) \in \{0, 2A, -2A, 0\}$, with the four values respectively corresponding to the LL, HL, LH, LL cases. It is seen that in the HL/LH cases the absolute value of the secondary $\Delta$-output is $2A$, whereas in the LL and HH cases the output is zero. The unused $\Delta$ port is then used as an indicator providing information that we have the HL/LH case at hand. Again, when this is the case $\Delta = \pm 2A$, whereas for LL and HH we have $\Delta = 0$. Mathematically, let us scale $\Delta$ by the multiplicative factor $\pi/2A$, yielding the phase $$\Phi \in \frac{\pi}{2A} \{0, 2A, -2A, 0\} = \{0, \pi, -\pi, 0\}$$

to be applied to the PM. The zero values correspond respectively to LL and HH whereas the $\{\pi, -\pi\}$ values correspond to LH/HL. For both LH/HL the PM effects phase rotation $e^{j\Phi} = e^{\pm j\pi} = -1$, whereas for the LL and HH cases it performs no rotation (rotation by zero phase). Recalling that $U \in \{-A, A, 3A\}$, the mid value A then flips its sign upon passing through the PM, becoming $-A$, yielding $V' \in \{-A, 3A\}$. This constellation may be left shifted by A (adding $-A$ to it), yielding the final antipodal output constellation $V' \in \{-2A, 2A\}$. This final shift would require terminating the gate in another adder (Hadamard gate), however this extra component may be avoided by combining it with the reference R of the next gate in line. E.g. if the next gate is again an AND, then its reference performs a right-shift by A, hence further adding in the required $-A$ value from the current gate yields zero, i.e. the reference of the next AND gates may be removed. On the other hand, if the next gate is a NOR, then its reference performs a left-shift by A, hence adding in the required $-A$ value from the current gate yields a total shift of $-2A$ to be applied to the next NOR gate.

Next section we shall see other possible implementations replacing the phase modulator by more realistic phase-amplitude modulation modules, as generated by optical gain media.

2. Lightwave Physical Realizations of the RLG Abstract Architecture

In the second stage of our description we show that the abstract RLG mathematical architecture is conducive to a variety of physical implementations by means of optical structures taking advantage of the physical properties of lightwaves. We disclose optical implementations of the RLG by optical means, based on two key characteristics of optical fields and light-matter interactions: Lightwave Interference (LI) to realize the LC functionality and Saturable Transmission (ST) i.e. Saturable Absorption (SA) or Saturable Gain (SG) or Parametric Processes to realize the PE functionality. The preferred embodiments for the PE at this point seem to be the ones based on Saturable Gain or Loss media.

2.1 Linear Combiner Realization

Figure 5:
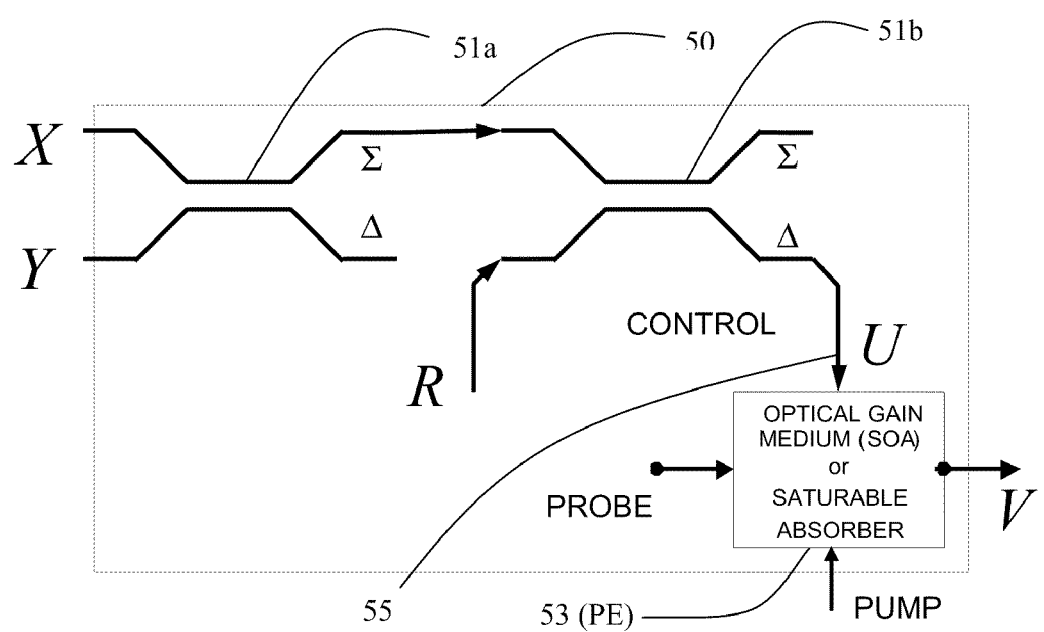
FIG. 5. Schematically depicts a possible photonic realization of the all-optical universal gate (all-optical FPGA): The linear combiner is implemented as the cascade of a pair of directional couplers performing the sum and difference of their respective inputs; The selection of the gate type is via the reference input, R, wherein the nonlinear phase erasure is generated in an optical amplifying medium, e.g. a Semiconductor Optical Amplifier (SOA) or in an optical saturable absorber, taking advantage of the Cross-Gain Modulation (XGM) nonlinear effect according to an exemplary embodiment of the current invention.

FIG. 5 schematically depicts a possible photonic realization of the all-optical universal gate 50. The linear combiner is implemented as the cascade of a pair of directional couplers 51 and 52 performing the sum and difference of their respective inputs; The selection of the gate type is via the reference input, R, wherein the nonlinear Phase Erasure (PE) 53 is generated in an optical amplifying medium, e.g. a Semiconductor Optical Amplifier (SOA) or in an optical saturable absorber, taking advantage of the Cross-Gain Modulation (XGM) nonlinear effect according to an exemplary embodiment of the current invention. The Nonlinear Phase Erasure (PE) 53 is generally an active device, such as gain medium, requiring pumping energy for its operation. The required energy is schematically depicted as "PUMP" port in this figure. The optional pump ports are depicted in other figures as "PUMP"; "P" or "Pi" where "i" is a number.

The LC property is fundamental in optics: Superposition of lightwave signals holds in linear optical media. This facilitates the realization of the LC mathematical function. Our preferred LC embodiments are based on Integrated Photonic Circuits (IPC). A simple example of an LC with two inputs is a Directional Coupler (DC), which acts as a 2×2 matrix. DCs such as 51$a$ and 51$b$ are readily designed of appropriate length such as to perform the Hadamard matrix function, such that one output is the sum of the two inputs while the second output is the difference of the two inputs: $\Sigma=X+Y$, $\Delta=X-Y$.

By cascading two directional couplers as indicated in FIG. 5, or by cascading two or three Y-junctions as indicated in FIG. 6$c$, we may readily realize a three-input one-output LC performing the signed sum of the three inputs: $Z=X+Y-R=\Sigma-R$ with $\Sigma \equiv X+Y$. More generally we realize the LC transformation $Z=aX+bY+cR$, where a,b,c are arbitrary complex-valued coefficients (in particular, $a=1$ and $b=\pm 1$ realizes the $\Sigma$, $\Delta$ functions, and $a=b=1$, $c=-1$ realizes $Z=X+Y-R$.

In FIG. 6$c(ii)$ we realize $Z=X+Y-R$ up to a constant by setting R1' and R2' such that R1'+R2'=−R.

In FIG. 6$c(iii)$ we realize $Z=X+Y-R$ up to a constant by setting R' such that R'=−R/2.

Such general implementation may also necessitate static phase-shifters and amplitude gains or losses (i.e. tunable complex gains) realizable by various integrated-optical techniques.

A key additional element is a methodology for tuning and tweaking the gates in the presence of fabrication imperfections, imperfect settings of the I/O signals, etc. (this is referred to as the "control plane for device calibration and tuning"). We assume the gates are endowed with phase and amplitude tunability on each of their inputs and possibly also on the outputs, enabling to actuate calibrations at the level of a single gate. We further assume that there are taps provided on some of the I/O ports for measuring amplitudes by means of monitoring photodiodes. Interferometric procedures are devised to tune the complex gains along each path, and the complex amplitude of the reference signal R to the desired operating points for optimal performance of each individual gate.

The C&R capability endows our universal gates with some resilience to repeated cascading, and is essential to achieving large-scale integration, further setting us apart from the myriad of other implementations in the literature. Additional resilience to fabrication imperfections and parameter variations may be attained by providing restoration quality to the PE, designing its amplitude transfer characteristic of the phase-eraser to exhibit a response approximating that of an ideal limiter.

The division of work between the linear and non-linear parts decouples the design degrees of freedom—the bulk of the logic processing occurs in the linear part, relieving the non-linear part of heavy constraints—the nonlinear part is just tasked with the phase erasing and the levels restoration. The linear-nonlinear partition opens the way for higher performance, more flexible implementations: the linear part is amenable to realization by modern integrated-optical passive techniques. The non-linear part is simpler than the nonlinear optical gates considered in the past, potentially realizable by harnessing a large variety of diverse optical phenomena.

To place our invention in perspective, it is worth recalling the usual features of the incumbent all-optic logic technologies available in the literature:

Limitations of "classic" approaches to optical gates based on non-linear optics:
  Strong bulky light sources required
  Operation rate limited by the material response
  Relatively long interaction regions Again, in the framework of our "divide-and-conquer" approach between the linear and non-linear parts of the gate, it is the linear part which efficiently performs the logic (by means of lightwave interference) up to a wrong phase, which must be erased by the nonlinear part, to ensure gate cascadability. In contrast existing all-optical logic approaches place the full onus of the logic implementation on the nonlinear part, typically experiencing tough tradeoffs between performance, energy efficiency and sheer size.

It is already evident that the tradeoffs in our approach are orders of magnitude more relaxed than in conventional approaches.

Once we have identified the salient feature of the optical front-end as a signed addition, $U=X+Y-R$ there are multiple ways to generate the simple signed sum of three optical beams in integrated-optics. E.g., we may simply cascade two directional couplers as shown in FIG. 5, terminating three of the four output ports. Alternatively, we may cascade two or three Y-junction combiners as shown in FIG. 6$c$. More generally, any type of three-port integrated optical coupler will do the job. The sign reversal on the R-port is simply obtained by tuning the optical length up to one affect a 180 degrees phase shift. In fact the other ports must also be tuned for particular optical lengths, with sub-wavelength precision, as is customary in integrated-optics (typically realizable by thermal or electro-optic bias tuning, with the last option preferable in our case). Again, it is remarkable that this simple optical structure may operate as a universal optical gate (up to the requirement to erase the phase at its output).

2.2 Phase Erasure Realization—Basic Configuration

The PE 53 is evidently non-linear, and may be realized by taking advantage of a variety of light-matter interactions. We may alternatively view the non-linear phase eraser as an all-optical detector, or as a phase-insensitive converter: The output is sensitive to the intensity of the optical input, however, unlike an opto-electronic photo-detector, wherein the input is optical and the output is electrical, here both the input and output are optical. Notice that unlike the photo-detection case, it is not necessary that the output of the all-optical detector be precisely proportional to the intensity of optical input. Almost any non-linear function of the intensity (or equivalently of the optical amplitude) will do. Moreover, arbitrary deterministic phaseshifts, which are functions of the optical intensity only, are also acceptable (the reason being that the universal gate in the next stage is able to absorb arbitrary input phase variations).

We propose using the gain saturation of pumped optical gain or loss media to this purpose, by using the input into the PE to saturate the amplifying or absorbing medium. The proposed configuration passes two beams through an optically pumped amplifying medium: the input into the device called control signal, and a second spatially separated probe beam at the same wavelength. The propagated probe signal is taken as the output of the nonlinear PE device. The probe beam is then amplified by the available gain in the medium, which is in turn affected only by the intensity (amplitude) of the input control beam, via the gain saturation effect.

For simplicity of description we may assume that the probe beam is much weaker than the control over the interaction region with the control signal (the probe beam may be further amplified in a post-amplifier region, wherein the control signal is not present), however this assumption is not necessary. The principle of operation is as follows: recall the property of optical amplification that the level of population inversion in an optical gain medium is determined by the pumping level, but also by the intensity of the overall optical signal, while it is insensitive to its phase. A stronger optical signal "saturates" the gain by reducing the amount of population inversion. Hence the output amplitude is solely modulated by the intensity of the control signal), insensitive to its phase. The gain saturation effect is simply modeled as a reduction of the differential gain, g, with increasing intensity according to the well-known formula.

$$g(I) \equiv \frac{1}{I}\frac{dI}{dz} = \frac{g(0)}{1+I/I_{sat}}$$

where $I_{sat}$ is a constant corresponding to the intensity reducing the differential gain to half its small—signal value.

We may alternatively describe the principle of operation of this PE as Cross-Gain Modulation (XGM).

The control input to the PE modulates the gain of the active medium, by modulating the population inversion. The population inversion modulated by the control signal, is further probed by a second beam. Higher control signal levels correspond to lower population inversion (saturation) hence higher gain for the probe, whereas lower control signal levels correspond to unsaturated, hence higher population inversion levels, yielding more gain thus yielding a higher output level for the probe signal (it is assumed that both saturated gains corresponding to the HIGH and LOW signals exceed the loss coefficient of the system, such that in both cases there is net gain of the probe, though at two different levels. It follows that the gain of the probe, and subsequently its output level are modulated by the intensity of the control signal. The intensity modulation of the control signal is transferred to the probe signal.

2.3 Phase Erasure Realization—Variations and Generalizations

We further generalized this principle of operation for the phase-eraser, in several respects:

(i) We recognized that it is not only the amplitude of the probe that is modulated by the pump intensity, but so is its phase (e.g. see Krammers-Kronig relations, or Slow Light techniques). Hence we may say that the complex gain of the probe, and subsequently its output complex amplitude, are modulated by the intensity of the pump. By complex gain we mean that both the amplitude or power gain and the phase of the probe are affected by the intensity of the pump. However, this does not invalidate the proposed scheme, since this parasitic phase modulation effect is counteracted by the ability of the next-stage gate to calibrate out arbitrary phaseshifts.

(ii) We recognized that it is possible to design PEs based on saturable absorption, rather than saturable gain. E.g. assume a gain medium wherein the pumping strength is sufficiently weak or even zero, such that there is no population inversion, i.e. the lower level of the optical transition is more populated than the higher level. Then an optical beam propagating through such a medium experiences loss rather than gain. Another possible case is when there is pumping to a level sufficient to generate population inversion and gain, however the gain is insufficient to overcome the differential loss through the medium, such that there is a net loss. In both cases, a control signal may further saturate the loss or gain, bringing the two populations closer to each other (reducing the population difference) than in the absence of the optical control signal. Now assume two different levels HIGH and LOW for the control signal. In the case when there is no population inversion, i.e. there is just loss, the presence of a higher control signal reduces the population difference, hence reduces the loss. Hence the HIGH (LOW) control input yields a HIGH (LOW) output probe. In the case that there is population inversion, but the gain does not suffice to overcome the loss the control signal saturates the gain, providing even less gain than in the absence of a control signal, i.e. HIGH (LOW) control provides high (low) loss, i.e. LOW (HIGH) output probe. In all these cases the phase information on the control is lost—as desired. The saturation of the gain or loss is solely determined by the amplitude of the control signal, not its phase.

(iii) We recognized that the control and probe may be separated according to degrees of freedom other than the spatial one. E.g. the control and probe may have different wavelengths, such that the phase erasure is accompanied by wavelength conversion. Hence, the input to the overall universal gate is at one wavelength, while the output may be at another. Alternatively, the control and probe may be separated by the modal degrees of freedom, e.g. propagating as two different modes of a multimode guiding structure (e.g. the fundamental and the first-order mode), providing that a modal coupling modality is available to effect the coupling into and out of the gain/loss medium, and separating the control and probe according to wavelength.

An alternative degree of freedom to separate the probe and control by is by polarization. The probe and control signals may then be of the same wavelength (coherent) and propagate collinearly, but have orthogonal polarizations, e.g. the TE and TM of the wave-guiding device with gain. At the output they may be separated by a polarization beam-splitter or polarization sensitive coupler. The advantage of working in two orthogonal polarizations is that spatial hole-burning in the active medium (arising in the case of spatially separated mutually coherent beams) is avoided.

(iv) Next section we introduce a PE realization that also acts as an ideal switch restoring the output amplitudes to one of two fixed levels, in the wake of input level variations. This will constitute our preferred implementation.

(v) Finally, in the framework of our general implementation, we are not bound to using cross-gain/loss modulation but are free to consider just about any physical phenomenon, upon seeking to realize the "all-optical detector" or the phase erasure. Hence, our patent application is formulated in encompassing generality to address all possible physical mechanisms of phase erasure. In fact it is possible to consider even non-optical implementations, e.g. microwave or superconducting linear analog circuits with some suitable PE mechanisms.

The identification of the abstract phase-eraser or phase-insensitive all-optical converter generic function allows substantial freedom in pursuing the most advantageous implementations, and physics creativity may be applied to determine the most efficient implementations, best fitting the overall material system requirements. Examples of additional optical embodiments of the phase-erasure are those based on parametric nonlinear processes, such as degenerate Four-Wave-Mixing (FWM) in which two optical signals U, W interact nonlinearly generating the FWM degenerate product $V=\chi_3 WUU^*=\chi_3 W|U|^2$, which is evidently phase-insensitive—a function of the absolute value of the input U. A potential problem with such parametric nonlinear realizations is that they require strong optical powers and long phase-matched interaction regions, hence the devices tend to be very bulky, not amendable to large scale integration. Hence, optically amplifying and absorbing media do feature as preferred embodiments for performing the phase-erasure function.

Another possibility is to give up the pure all-optical realization and realize the phase erasure as an opto-electronic repeater, usually referred to as an O/E=>E/O cascade, namely a photo-detector immediately followed by a light source (laser). Since the photo-detected electrical current is proportional to the intensity of the incident optical signal, this indeed provides a realization of the phase-erasure function. Although this approach appears bulky, it is amenable to opto-electronic integration, e.g. by means of hybrid Si\III-V Evanescent Laser bonding technology (e.g. A. W. Fang et al, Optics Express 14, 9203 (2006), and A. W. Fang, Opt. Express 16, 4413 (2008)) providing a platform for integration of detectors, modulators, mode locked lasers, optical amplifiers, all integrated with silicon. The basis of this integration technology is that the optical wave-guiding mode is largely confined to silicon waveguide. The evanescent tail overlaps the active material. Then, the linear combiner part would be realized in Silicon-On-Silica (SOI), and the back-to-back photo-detectors and lasers sources in the III-V bonded substrate. It should be mentioned that repeaters consisting of back-to-back photo-detectors and lasers sources are now industrialized by the Infinera Company in III-V optoelectronic integrated circuits, whereas the Luxtera Company demonstrated wafer fabrication of optical circuits on Silicon-On-Silica (SOI) in standard CMOS foundries. The integration of the two opto-electronic technologies, as evidenced in the works of Fang et al, is also of interest to Intel. None of these technology platforms are directed at this point towards all-optical or opto-electronic logic, but rather the effort is to integrate conventional optical transceivers, however those technology platforms, might be used to support our proposed optical logic architecture.

2.4 Approaching an Ideal Switching Characteristic: Slicer-Inverter

We now introduce our preferred PE embodiment, realizing or closely approximating the combination of the PE function plus an additional nearly ideal amplitude limiting function, obtaining an "abrupt" switching characteristic (along with the phase erasure) in effect acting as a one-bit quantizer (and acting just on the input amplitude or power, erasing the phase). We shall also see that the one-bit quantization has an inverter characteristic, i.e. the high (low) amplitude input range is respectively represented as a low (high) output level. Hence, we shall describe the resulting module as a phase-erasing one-bit quantizer-inverter or Phase-Erasing Slicing-Inverter (PESI) or when there is no ambiguity—just slicing-inverter, or most briefly inverter. However, we should recall that this is a sophisticated inverter which operates on a complex-valued input amplitude while discarding its phase, i.e. it is also endowed with the phase erasure function.

Figure 6A:
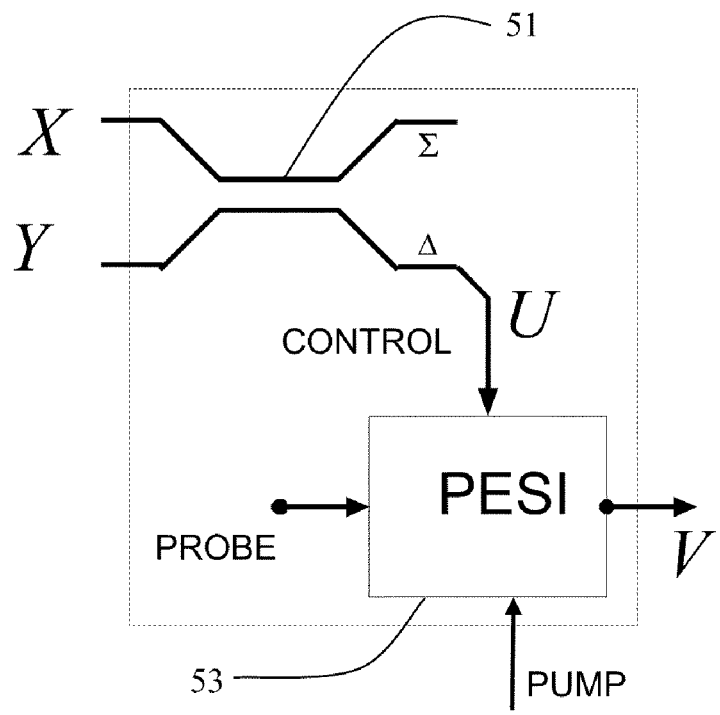
FIG. 6a. Schematically depicts a simplified gate structure having a single coupler followed by an optical gain medium for implementing the PESI function according to an exemplary embodiment of the current invention.

FIG. 6a. Schematically depicts a simplified gate structure having a single coupler followed by an optical gain medium for implementing the PESI function according to an exemplary embodiment of the current invention.

It should be noted that in some cases only one of the two outputs of a coupler is used, for example as in the cases depicted in FIGS. 5 and 6a. In these cases, the unused ("dangling") output is preferably optically terminated to prevent unintentional reflection of light. In these cases, the four terminals coupler may be replaced with a Y-junction coupler having two inputs and one output. The unused energy is preferably dissipated in the substrate of the device or exits the light channels by leaking into the surrounding.

Figure 6B:
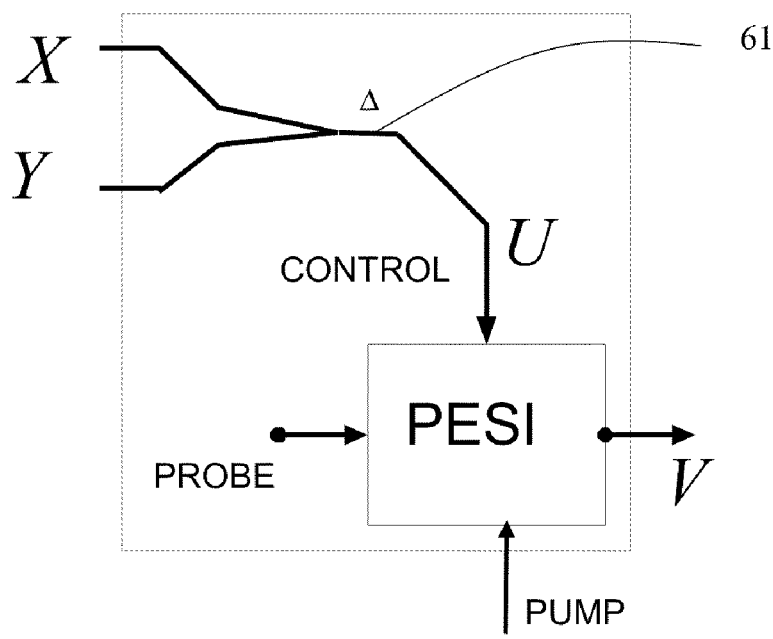
FIG. 6b. Schematically depicts a simplified gate structure having a Y-junction combiner, followed by a PESI module erasing the phase and providing a regenerative transfer characteristic with threshold according to another exemplary embodiment of the current invention.

FIG. 6b. Schematically depicts a simplified gate structure having a Y-junction combiner 61, followed by a PESI module erasing the phase and providing a regenerative transfer characteristic with threshold according to another exemplary embodiment of the current invention.

Figure 6C:
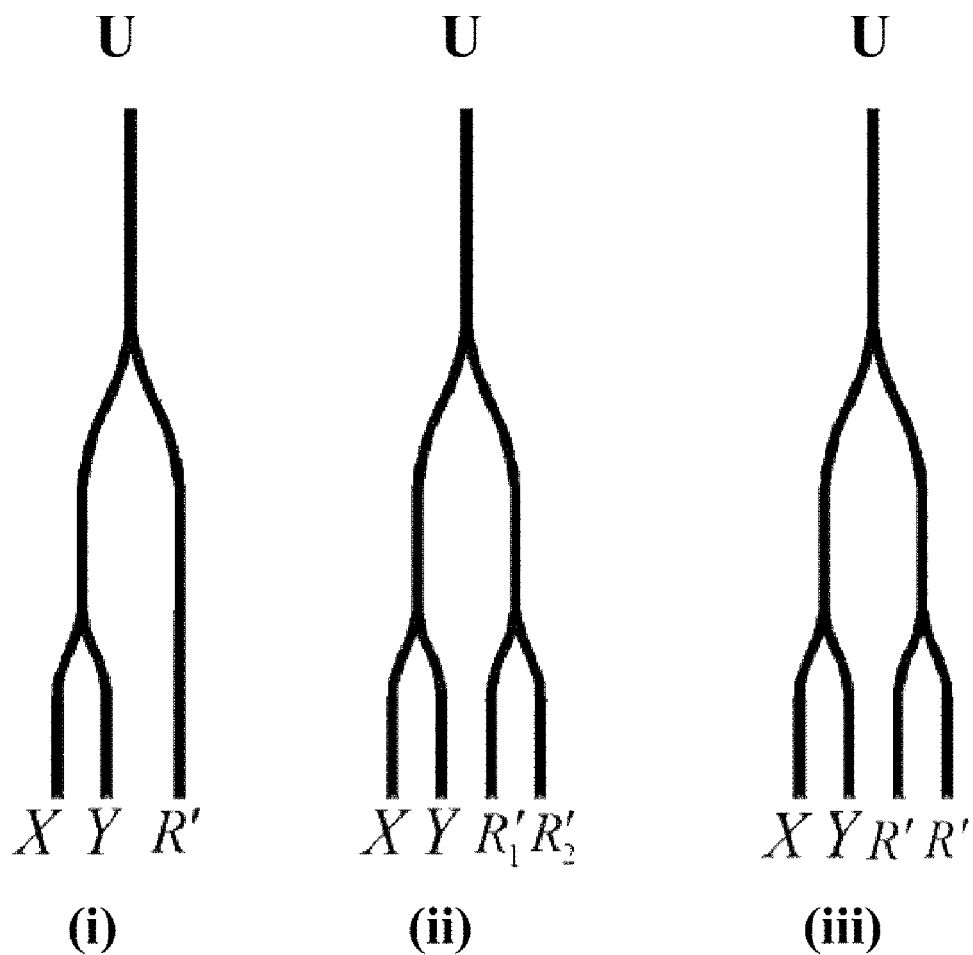
FIG. 6c. Schematically depicts configurations for Linear Combiners used as front-ends of reconfigurable all-optical logic gates according to embodiments of the current invention.

Exemplary Y-junction optical designs are depicted in FIG. 6c(i); (ii) and (iii). The functionality of these designs was verified by the inventors in simulations. These designs implement the U=X+Y−R linear combination, which when terminated by a PE generates multiple logic truth tables, as selectable by the value(s) of the reference(s).

Note: a simple linear inverter design acting on a fixed binary complex alphabet is simply realized as a directional coupler implementing the $\Delta$-operation between the input and the High value of the input, $\Delta=X-X_H$. Indeed, when the input is $X=X_H$ then the output is $\Delta(X=X_H)=0$, and when $X=X_L$ then $\Delta(X=X_L)=X_L-X_H$, hence we have $|\Delta(X=X_H)|<|\Delta(X=X_L)|$, i.e. this simple linear transformation effects level inversion here. However the slicer-inverter is functionally preferable to this simple linear inverter, as it further provides output logic level restoration in addition to the logic inversion, yielding precisely one of two logic values at the output, even when the input logic levels have variations.

In devising our slicer-inverter, our objective is to discriminate between two input field amplitude ranges that are disjoint, quantizing one range to one output value, and the other range to another output value, attaining an ideal switching characteristic. More precisely, the two "decision ranges" are separated by a threshold, $A_{Th}$, such that $|X|\geq A_{Th}$ is sliced or quantized as L, and $|X|<A_{Th}$ is quantized as H.

In optical implementations we shall use the signal intensities (absolute-squared amplitudes) to describe the device. For definiteness, consider using this new slicer-inverter module as the terminating block of the nominal AND and NOR gates introduced above, the linear part of which generates the two intensity level ranges $[I_L^-, I_L^+]$, $[I_H^-, I_H^+]$ with $I_L^-<I_L^+<I_H^-<I_H^+$. Assuming we manage to design a slicer-inverter with threshold $I_{Th}$ in between the two ranges, i.e. If $I_L^+<I_{Th}<I_H^-$, then we will have realized an ideal gate, overcoming small impairments of the input alphabet and the linear combining.

The proposed PESI device, seen in FIG. 6a (and 6b), essentially comprises a gain medium 53 pumped by any convenient means (optical, electrical, etc.) at such a pumping level that it achieves transparency (differential gain=differential loss) at a control input 55 intensity level $I_{TTh}$, referred to here as transparency threshold, which satisfies $I_L^+<I_{TTh}<I_H^-$, i.e. the system is designed (the pumping level is selected) such that its transparency threshold is set in between the LOW and HIGH input power ranges of the preceding linear portion of the gate. The input to the gate, called the control signal may then either exceed the threshold or fall under the threshold, depending on whether the output of the preceding linear portion of the gate) is HIGH or LOW. If the control signal were set at an intermediate level $I_{TTh}$, then the balance of pumping, tending to raise the upper lasing level, and the saturation effect, tending to reduce the upper lasing level (when the population is inverted), is such that the attained gain just balances the loss:

$$g_{net}(I_{TTh}) = g(I_{TTh}) - \alpha_0 = \frac{g_0}{1 + I_{TTh}/I_{sat}} - \alpha_0 = 0$$

Solving this equation for $I_{TTh}$ yields $$I_{TTh} = I_{sat}\left(\frac{g_0}{\alpha_0} - 1\right).$$

This is the control input level that achieves transparency. At any control power level $I_H$ exceeding the threshold, $I_{TTh} < I_H$ the medium experiences gain saturation, i.e. it supplies a lower gain than that provided at the power level $P_{TTh}$ which just sufficed to balance the net loss (this follows since the saturation function $g(I) = g_0/(1 + I/I_{sat})$ is monotonically decreasing in I, and we have $I_H > I_{TTh}$, hence $g(I_H) < g(I_{TTh}) = \alpha_0$):

$$g_{net}(I_H) = g(I_H) - \alpha_0 = \frac{g_0}{1 + I_H/I_{sat}} - \alpha_0 < 0$$

Therefore, at any HIGH control intensity $I_H$, the system would supply net loss to a weak probe optical signal. Conversely, at any intensity level $I_L$ lower than the transparency threshold, the medium would supply net gain, as its gain saturation is reduced relative to that at $I_{TTh}$ which just sufficed to balance the net loss, i.e. the gain now exceeds the loss, yielding net gain:

$$g_{net}(I_L) = g(I_L) - \alpha_0 = \frac{g_0}{1 + I_L/I_{sat}} - \alpha_0 > 0$$

The net gain or loss available from the medium, as set by the control signal, $I_L$ or $I_R$, respectively, is tested by a separate probe signal, which is angularly, spectrally, or modally separated from the control signal; angularly separated means travelling at a different range of angles, spectrally separated means having a different range of wavelengths, and modally separated it means propagating in a different range of waveguiding modes. Assume for conceptually convenience that the probe is launched with very low power (though this assumption is not strictly necessary nor desirable, as it may result in weak SNR). When there is net gain (i.e. in case the control is set to $I_L$), assuming that the amplifying medium is sufficiently long, the probe signal intensity level $I_p(z)$ along the medium initially grows exponentially, then the gain saturation sets in, i.e. the gain g(z) is saturated (reduced) with growing intensity according to the formula $$g(z) = \frac{g_0}{1 + (I_L + I_p(z))/I_{sat}}$$

Now the net gain coefficient is the difference of the gain and loss coefficients $$g_{net}(z) = g(z) - \alpha_0 = \frac{1}{I_p(z)}\frac{dI_p(z)}{dz} = \frac{d}{dz}\ln I_p(z)$$

We may then formulate the differential evolution step $$\begin{aligned}I_p(z+dz) &= I_p(z) + dI_p(z) \\ &= I_p(z) + I_p(z)g_{net}(z)dz \\ &= I_p(z)\{1 + [g(z) - \alpha_0]dz\} \\ &= I_p(z)\left\{1 + \left[\frac{g_0}{1 + (I_L + I_p(z))/I_{sat}} - \alpha_0\right]dz\right\}\end{aligned} \quad (0.15)$$

or $$I_p(z+dz) = I_p(z)\left\{1 + \left[\frac{g_0}{1 + (I_L + I_p(z))/I_{sat}} - \alpha_0\right]dz\right\} \quad (0.16)$$

indicating that the intensity level first grows along the +z axis, albeit at a lower and lower spatial rate of increase, as the increase in intensity reduces the differential gain; the intensity level keeps increasing to the point where the net gain is saturated down to zero, at which point the level no longer grows. From this point on the total intensity is constant at level $I_{TTh}$ and the net gain continues to maintain zero value, i.e. we have transparency, i.e. we have reached the steady state saturated transparency level. Hence, in the steady state the gain g(z) is now saturated down to the level of the loss $\alpha_0$, i.e. square brackets in (0.15) nulls out. Solving for $$I_p(\infty) \text{ in } 0 = \frac{g_0}{1 + (I_L + I_p(\infty))/I_{sat}} - \alpha_0,$$

yields $$I_L + I_p(\infty) = I_{sat}\left(\frac{g_0}{\alpha_0} - 1\right) = I_{TTh}$$

hence the steady state probe intensity is $I_p(\infty) = I_{TTh} - I_L$.

Notice that this probe output level is achieved for LOW control inputs, $I_L$, (i.e. lower than the transparency threshold) and is independent of the initial value with which the probe signal was launched (provided the medium is sufficiently long, practically for $z > 3/|g_{net}(I_L)|$).

Now assume that the control optical level is HIGH, $I_H$, (i.e. it exceeds the transparency threshold) then the probe experiences net loss as explained above. It follows that regardless of the initial value with which the probe signal was launched the probe output will attenuated to zero, provided the medium is sufficiently long, practically for $z > 3/|g_{net}(I_H)|$.

If the medium is not sufficiently long, the range of input values $I_H$ is mapped into a range of output values that is much more compressed close to zero. E.g. for a NOR gate the linear combiner outputs LH, HL, HH correspond to three distances that are ideally equal but due to imperfects may have some small spread. Once they propagate through the limiter the output values are all very close to zero, much more bunched together than the original input values.

Similarly, if the medium is not sufficiently long, the range of input values $I_L$ is mapped into a range of output saturated values that is much more compressed than the input range.

This indicates that the output probe intensity well approximates the ideal switching or slicing characteristic $$I < I_{TTh} \Rightarrow I_p(\infty) = I_{TTh} - I_L$$

$$I > I_{TTh} \Rightarrow I_p(\infty) = 0$$

with breakpoint at the transparency threshold intensity, $I_{TTh}$.

The effect will be more pronounced if some optical feedback is applied, i.e. a regenerative amplifier with a low-Q cavity is used. In effect the optical signal recirculates multiple times around the cavity, hence it amounts to having a longer linear device (without feedback), and the signal tends to reach saturation, which is desired for our application, in order to restore the output to precisely two logic levels. The problem with regenerative cavities that they have a Q—take some time to "charge the optical capacitor" i.e. build up energy in the cavity, so there is a tradeoff between size and bandwidth. Moreover, the resulting Fabri-Perot cavity must be tuned to its optimal operating point.

We must now mention that the output of the limiter is unipolar rather than bipolar, hence a final unipolar to bipolar mapping is required at the PE output in order to condition the signal to be suitable as input for the next gate. Hence, there is a third coupler to be inserted at the gain medium output. However, an alternative is that this coupler may be "deferred" to the next gate, wherein it may be combined with the second coupler performing the reference subtraction (provided that the "next gate" actually starts with a coupler—we shall further introduce designs wherein each gate has inserted in each of the two input ports of its first coupler certain nonlinear modules—limiter-inverters—intended to condition the input levels into the first coupler—for such designs the measure suggested here is no longer possible). Hence, by deferring the final coupler of each gate to the next gate and combining it with the reference coupler there, we may maintain a maximum of two couplers per gate, using this approach, though now the different gates may no longer be individually designed.

FIG. 6c. Schematically depicts configurations for Linear Combiners used as front-ends of reconfigurable all-optical logic gates according to embodiments of the current invention: FIG. 6c(i) shows an asymmetrical structure using two Y-junction-combiners; FIG. 6c(ii) shows a symmetrical structure using three Y-junction-combiners using different reference values are used; and FIG. 6c(iii) shows a symmetrical structure using three Y-junction-combiners using two reference values set to a common value R'. In exemplary embodiments light waves propagate from the X, Y and R inputs to the U output.

Y-Junction Combiner+Thresholder Makes a NAND Gate:

We now show that if the phase-eraser is regenerative (i.e. we have a PESI thresholder at our disposal), then the overall gate structure may be simplified: the linear stage may be reduced to a single addition, $U \equiv X+Y$ (subtraction will also work), e.g. optically realized by a single directional coupler (FIG. 6a). or even more simply by a Y-junction combiner waveguide structure (FIG. 6b). (when the phase-eraser is non-regenerative, it is necessary to use the more complex adder-subtractor LC, comprising two DCs or two or more Y-junction combiners as in FIG. 6c).

The principles of operation provide reconfiguration to multiple gate types, and arbitrary alphabets, but let us start with a simple illustrative case using a simple unipolar (on-off) real-valued alphabet: a NAND gate based on a single DC or Y-junction terminated in an inverse thresholder (PESI device): The two logic inputs X Y, attaining values in the unipolar alphabet F$\leftrightarrow$0, T$\leftrightarrow$A, are combined by means of the Y-junction or DC, generating U=X+Y. As X, Y $\in$ {0, A}, the possible values of U are {0, A, A, 2A}, for the FF, FT, TF,TT inputs, respectively. Set the threshold at 1.5A i.e. generate zero when U>1.5A, generate A otherwise. Evidently zero output is obtained only when U=2A, i.e. in the TT case, whereas an A output is generated for either of the FF, FT, TF input combinations. Hence, we have indeed realized an all-optical NAND gate using a single combiner (either a directional coupler or a Y-junction) terminated in a PE device.

As a second example, A pair of directional couplers+phase erasure||makes a NOR gate: Assume a PESI device with sharp transition is not available, yet we have at our disposal a non-regenerative phase-eraser, e.g. $\|$ or $\|^2$, which may be simpler to realize than the thresholder. Then we may still realize multiple AO logic gates, provided we precede the non-linear phase-eraser with a pair of DCs rather than just a single combiner, generating the adder-subtractor LC described by (2) or (4) as shown in FIG. 1b. Here we exemplify just a NOR gate with such structure, again using the unipolar alphabet. As X, Y$\in${0, A}, the possible values of the first coupler output $\Sigma \equiv X+Y$ in response to FF,FT,TF, TT, are $\tau \in$ {0, A, A, 2A} as above. Now subtract a reference R=1.5A by means of the second coupler, U$\equiv \Sigma$-R, yielding three possible levels U$\in$ {-1.5A, -0.5A, -0.5A, 0.5A}. After taking the absolute value, the phase (sign) is erased, yielding just two levels, |U|$\in$ {1.5A, 0.5A, 0.5A, 0.5A}, i.e. we obtain 1.5A for the input pair FF and 0.5A for FT, TF, FF. We have thus realized a NOR gate under the output alphabet assignment $F_{out} \leftrightarrow$ 0.5A, $T_{out} \leftrightarrow$ 1.5A. To restore the output alphabet to a unipolar one, {0,A}, we may simply subtract 0.5A from the output alphabet {0.5A, 1.5A}. Actually, this step may be saved by absorbing it within the reference subtraction occurring in the following gate driven by the current gate output.

Computer Simulations of Unipolar Reconfigurable Gates

We numerically demonstrated the principle of operation of the novel reconfigurable gates over the unipolar alphabet. The Rsoft FullWAVE™software package was used for Beam Propagation Method (BPM) and Finite Differences Time Domain (FDTD) simulations of the integrated-optic realizations of the gates LC stage.

It was seen that gate implementations lacking PESI, i.e. using PEs without regeneration, require an adder-subtractor type of LC, henceforth referred to as standard LC. In fact the more general linear combination may also be used to generate logic functions, by rescaling the logic inputs and the reference, accordingly. E.g., rather than using a pair of DCs to generate, a standard LC may be alternatively implemented by a pair of Y-junction combiners, interconnected as shown in FIG. 6(a), essentially generating a linear combination of the form $$U=a(X+Y+\gamma R'),$$

whereby the inputs X, Y experience the same loss, by symmetry. Notice that the factor $\gamma$ satisfies $|\gamma|>1$, since the loss experienced by the X, Y inputs, which traverse two Y-junctions, exceeds that of the R' reference which only passes through a single Y-junction. Discarding the inconsequential loss factor a, and setting R'=-R/$\gamma$, the above expression is seen to be equivalent to our standard LC. E.g. an AND gate nominally requiring R=0.5A, would use a scaled reference R'=-A/(2$\gamma$) when implemented in the structure of FIG. 6(a). Moreover, $\gamma$ is complex-valued, with its phase determined by the optical length differences between the signal and reference paths. When calibrating actual or simulated devices, it is difficult to evaluate the magnitude and phase of the factor γ. To mitigate the calibration issues, it is useful to introduce a symmetrical balanced structure as shown in FIG. 6(b). This version of the LC has two reference inputs, $R'_1$, $R'_2$, implementing a four-wave linear combination $U=a(X+Y+R'_1+R'_2)$.

For the purpose of simple and reliable simulations, it is most advantageous to use this structure due to its "self-calibration" property: all four inputs (the two logic inputs X, Y and the two references $R'_1$, $R'_2$) experience the same attenuation, a, as they traverse identical paths to the output, due to the symmetry of the device. Hence the structure of FIG. 6(b) circumvents special calibration of unknown attenuation and phase factors. Discarding the inconsequential common scale factor, a, and selecting $R'_1$, $R'_2$ such that $R'_1+R'_2=-R$, the standard LC is retrieved. In particular it is convenient to set the two references identical, $R'_1=R'_2=-R'$, denoting the two equal references by R' (FIG. 6(c)), yielding $U=a(X+Y+2R')$. To map this structure to a standard LC, we simply select the scaling $R'=-R/2$. We have seen that NOR, AND and XNOR gates respectively require $Re\{R_H, R_L, R_M\}=\{1.5A, 0.5A, A\}$ as reference in the standard LC. When implementing the reconfigurable gates by means of the structure of FIG. 6(c), the reference values should then be scaled down to $R'\epsilon\{-0.75A,-0.25A,-0.5A\}$.

We simulated the Y-junction-combiner-based alternative structures of FIG. 6c for implementing the standard LC. However, we shall revert to mostly considering the 'pair of directional couplers' (DC-pair) structure, whenever referring to the implementation of a standard LC (although any of the structures of FIG. 6c could be substituted for the DC-pair). Despite the Y-junctions-based structures being simpler, a unique feature of the 'DC pair' structure is the availability of additional "dangling ports" which might be utilized in certain cases to feed additional logic gates as described in section 5.1. In contrast, when using Y-junction combiners, the power of the anti-symmetric modes of the double waveguide structure feeding the Y-junction gets dissipated in the substrate.

Control/Probe Orthogonal DOFs:

The proposed configuration then passes two beams through an optically pumped amplifying medium: the input into the device, called here control signal, and a second probe beam, separated by some optical Degree of Freedom (DOF) from the control signal, optical DOFs meaning angle, polarization, propagation mode, or wavelength. Unlike most SOA-based logic designs in the literature, our approach has both the probe and control beams operating at the same wavelength, hence we rely on either of the first three types of DOFs for orthogonal separation of the control and probe. Single wavelength operation of the optical logic circuit makes it more amenable to photonic integration. In detail the probe signal spectrally coincides with the control signal but is separated from it either angularly, modally or in polarization. "Angularly separated" means travelling at a different range of angles. "Modally separated" means the two signals propagate as two different modes of a multimode guiding structure (e.g. the fundamental and the first-order mode). "Polarization separated" means that both signals are coherent and propagate collinearly, but are launched in orthogonal polarizations, e.g. TE vs. TM, by means of a Polarization Beam Splitter (PBS), and are also separated at the output by a PBS. The advantage is the avoidance of spatial hole-burning in the active medium, which arises in the case of angularly separated mutually coherent beams.

An O3P is a 3×3 optical multiport, i.e. a device with three input and three output ports. For our application we terminate two of the output ports. The complex amplitude at the retained output port is then a linear combination of the complex amplitude of the three inputs. By "symmetrically structured" we mean that the O3P has three-fold rotational symmetry. Either a fused-fiber O3P fabricated by twisting and fusing three single-mode fibers, or a mixed-rod device where a thin platelet of glass mixes light from three input fibers and divides it among three output fibers, may be constructed with 3-fold symmetry. Let X,Y,R be the O3P inputs and U,U',U" the outputs, then an ideal lossless symmetrically structured O3P device is described by the following unitary transfer matrix, with phase-factors $w \equiv e^{j2\pi/3}$, $u_i \equiv e^{j\Psi_i}$, $v_k \equiv e^{j\Phi_k}$:

$$\begin{bmatrix} U \\ U' \\ U'' \end{bmatrix} = \frac{1}{\sqrt{3}} \begin{pmatrix} v_1 u_1 & v_1 u_2 & v_1 u_3 \\ v_2 u_1 & w v_2 u_2 & w^2 v_2 u_3 \\ v_3 u_1 & w^2 v_3 u_2 & w^4 v_3 u_3 \end{pmatrix} \begin{bmatrix} X \\ Y \\ R \end{bmatrix}$$

$$= \text{diag}[v_1, v_2, v_3] \begin{pmatrix} 1 & 1 & 1 \\ 1 & w & w^2 \\ 1 & w^2 & w^4 \end{pmatrix} \text{diag}[u_1, u_2, u_3]$$

Notice that all the matrix elements have identical magnitude, a consequence of the 3-fold structural symmetry, however their phases depend on $\Psi_i$, $\Phi_k$ which in turn are affected by the selection of reference planes along the input and output waveguides. As in the case of the cascade of two DCs, an O3P based implementation also requires the ability to tweak the complex amplitudes on the I/O ports, in effect tuning the $u_i$ and $v_k$ parameters. In our application, we adjust these parameters to satisfy $v_1 u_2 = v_2 u_2 = -v_3 u_3$, such that $$U = \frac{1}{\sqrt{3}}(X + Y - R),$$

and we terminate the U', U" outputs, thus realizing the desired LC function. The O3P may be realized as a multi mode interference (MMI), waveguide fabricated as part of planar photonic circuit.

2.5 Application of the Nearly Ideal Switching Characteristic—Eliminate the Reference Simply adopting such a PESI device with nearly ideal switching characteristic as a substitute for the Phase-Erasure terminating module improves the restoration properties of the gates. Furthermore, the availability of such a PESI allows to simplify the LC hardware for the AND and NOR gates, by eliminating the second coupler altogether albeit at the expense of reducing the distance discrimination (the SNR of the gate).

Considering here the unipolar case i.e. AND, NOR and XOR gates with unipolar inputs X, $Y\epsilon\{0, A\}$, (and assuming unnormalized signed additions). Using the unnormalized Hadamard matrix convention (recalling that everything is to be normalized at the end by $1/\sqrt{2}$) we have $\Sigma\epsilon\{0, A\}+\{0, A\}=\{0, A, 2A\}$ with the midvalue A, corresponding to the LH and HL whereas 0 and 2A respectively correspond to LL and HH. The AND gate right-shifts $\{0, A, 2A\}$ by $-A/2$, yielding $\{-A/2, A/2, 3A/2\}$, whereas the NOR gate left-shifts $\{0, A, 2A\}$ by 1.5A, yielding $\{-3A/3, -A/2, A/2\}$. In any case the $-A/2$, A/2 values must be merged, coalesced into a single (LOW) output logic value, A, with the HIGH logic value provided by $\pm 3A/2$. This is where a phase erasure characteristic (taking the absolute value) comes handy. However, now we show that the left and right shifts by A are not essential, hence may be eliminated, in case we have access to an ideal PESI. Indeed, inspecting the output {0, A, 2A} of the first coupler, for an AND gate we must merge the left two signals, 0,A (corresponding to LL and HL/LH), whereas for a NOR gate we must merge the right two inputs, A, 2A (corresponding to HL/LH and HH). This is simply accomplished by setting the threshold to separate the two values to be merged from the remaining value. As we treat an AND gate case we set the threshold in-between 0 and A. Similarly, for a NOR gate we set the threshold in between A and 2A.

Note: The best selection of threshold is not half way between the amplitudes 0 and A (for the AND gate), but rather half-way between the powers, $\{0, A^2\}$, i.e. at power $A^2/2$ or amplitude $A/\sqrt{2}$. Actually, the normalization by the factor $2^{-1/2}$ should also be factored in—the discussion above pertains to un-normalized values.

FIG. 6a schematically depicts a simplified gate structure having a single coupler followed by an optical gain medium for implementing the PESI function according to an exemplary embodiment of the current invention.

The gates structure then simplifies at this point to a single coupler followed by an optical gain medium implementing the PESI function, as shown in FIG. 6a. Actually, since the PESI provides level inversion (High values yield Low output due to the saturation) it may be considered as an additional logic inverter cascaded at the output of the original gate (for positive logic). The AND gate terminated in a PESI then becomes a NAND gate, whereas the NOR gate terminated in a PESI becomes an OR gate.

Finally, let us consider the XOR gate. For this gate we have seen that the reference coincides with the middle value, $R_M=A$, i.e. the output of the first coupler, {0, A, 2A} is left-shifted by A, yielding $U \in \{-A, 0, A\}$, with the three values respectively corresponding to LL, LH/HL and HH. The two LL and HH values $\pm A$ must be merged by taking the absolute value, both coalescing into the single value A: The output alphabet is then $V' \in \{A, 0\}$. Using a PESI device with threshold at zero, we then perform the phase-erasure function.

An ideal limiter characteristic is actually discontinuous at the threshold, but a practical limiter with a finite but sufficiently high slope of its transition region may function well as well for a threshold selected as zero, whereas $-A$ and A are both mapped into the same HIGH output value.

Notice that in all cases the logic at the output of the limiter switching characteristic is unipolar. If a bipolar alphabet is desired, additional unipolar to bipolar mapping is required to be applied at the PE output. Hence, there is an extra coupler reinserted back after all, however this coupler now follows the PESI gain medium rather than preceding it. Likewise the inputs must be switched from bipolar to unipolar, requiring a coupler.

2.6 Energy Efficiency Considerations—Putting the Unused Ports to Work

We now discuss the energy efficiency of the linear combiner sections of our all-optical gate family. Assuming that we use ideal devices with zero excess loss, the unused coupler ports leak out energy, apparently bringing the average power efficiency of the linear combiner section down to 25% (50% in each of the two couplers).

Assume lossless couplers, described by a normalized Hadamard matrix (the $2^{-1/2}$ factor is necessary to make the matrix unitary, preserving energy from input to output, $|X|^2 + |Y|^2 = |\Sigma|^2 + |\Delta|^2$):

$$\begin{bmatrix} \Sigma \\ \Delta \end{bmatrix} = 2^{-1/2} \begin{pmatrix} 1 & 1 \\ 1 & -1 \end{pmatrix} \begin{bmatrix} X \\ Y \end{bmatrix}$$

For bipolar signals, $[X, Y]=[\pm A, \pm A]$ the two outputs of the first coupler are $[\Sigma, \Delta]=[\pm\sqrt{2}A, 0]=2^{-1/2}[\pm 2A, 0]$ (we prefer to factor out the $2^{-1/2}$ in order to highlight the $\pm 2A$ obtained by simple addition corresponding to working in effect with an unnormalized Hadamard matrix), whereas for $[X, Y]=[\pm A, \mp A]$ we have $[\Sigma, \Delta]=[0, \pm\sqrt{2}A]=2^{-1/2}[0, \pm 2A]$. Hence on the average, assuming that High and Low inputs are equally likely, the average power at the $\Delta$-port (and also of the $\Sigma$-port) is $P_\Delta=0.5 \cdot (\pm\sqrt{2}A)^2 + 0.5 \cdot 0^2 = A^2$ which is half of the total power $(\pm A)^2+(\pm A)^2=2A^2$ launched into the device.

As for the second coupler, effecting the subtraction of the reference, its main port is the $\Delta$-port, whereas its $\Sigma$-port is unused—in fact this port may be used to implement that "other" output, e.g. for an AND gate this port yields NOR, whereas for a NOR gate the unused port may be put to work to yield an AND, as shown next.

In the earlier un-normalized model, not accounting for the $2^{-1/2}$, we subtracted a negative-valued reference $-A$, which amounts to right shifting by A the "logic constellation" $\{-2A, 0, 2A\}$ at the $\Sigma$-port of the first coupler. Now accounting for the $2^{-1/2}$ normalization factor, the reference is $R=-2^{-1/2}A$, the input into the second coupler is $2^{-1/2}\{-2A, 0, 2A\}$, and after subtraction of the reference, the main output of the LC is taken at the $\Delta$-port of the second coupler, attaining the values $U_\Delta \in 2^{-1/2}\{-A, A, 3A\}$. Similarly, the unused $\Sigma$-port output of the second coupler is obtained by adding $R=-2^{-1/2}A$ to the input $-2^{-1/2}\{-2A, 0, 2A\}$, yielding $U_\Sigma \in -2^{-1/2}\{-3A, -A, A\}$ at the $\Sigma$ port. Notice that the two outputs $U_\Delta$, $U_\Sigma$ of the second coupler (the function of which is to subtract the reference) are not complementary ($|U_\Delta|^2+|U_\Sigma|^2 \neq$ const, the reason is that the input energy into the second coupler is not constant). The useful output was defined as taken at the $\Delta$-port, while the $\Sigma$-port was wasted. It is readily verified that by terminating the unused $\Sigma$-port in an additional PE, we obtain "the other" logic output. E.g. for an AND gate, we get also a NOR output; For a NOR gate we also get an AND output. The additional "other" logic output may be used for convenience, in case both types of gates are required. In this case, the energy efficiency of the gate effectively decreases to 50% (all due to the first coupler) as no signal is considered lost in the second coupler.

We further mention that using PESI devices with sufficient optical amplification gain, in principle allows fan-out (having one logic output drive two or more gates), by means of optical splitters attached to the optical outputs.

Figure 7:
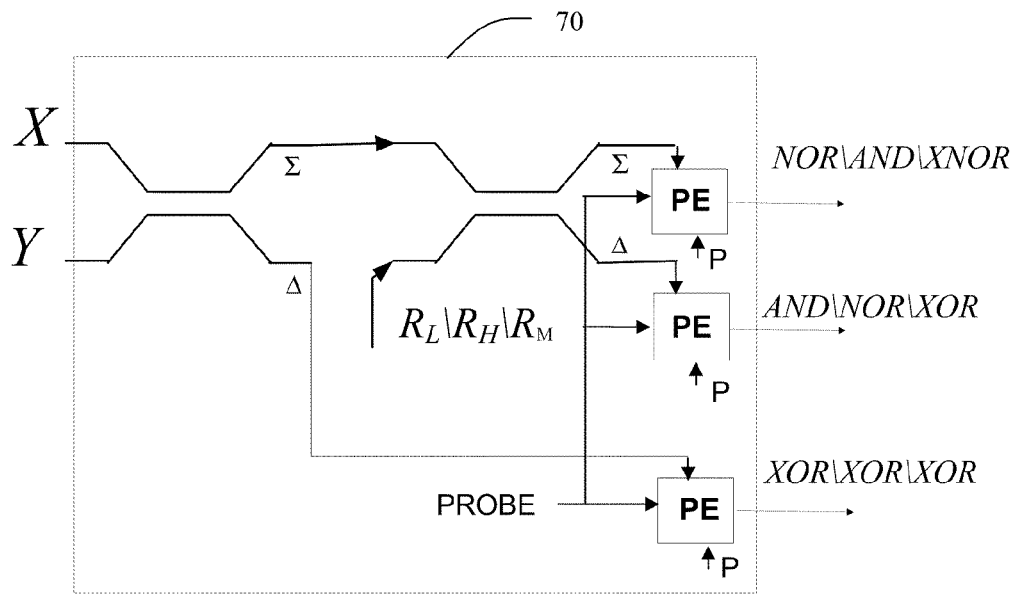
FIG. 7. Schematically depicts an All-Optical gate design using all four output ports of the two couplers, wherein switching the reference between its three possible values gives at the output two or three logic functions of the inputs according to an exemplary embodiment of the current invention.

Returning to consider the first coupler (for an AND or NOR gate), its unused $\Delta$-port actually generates the XOR of the two inputs, whereas the $\Sigma$-port actually generates the XNOR (=NOT[XOR]) of the two inputs. Its $\Sigma$-port is used to feed the second coupler which subtracts the reference, while the $\Delta$-port may be terminated in a PE or PESI device, the output of which would provide an additional XOR output. Hence either of the gates previously referred to as "AND" and "OR" is extended (by adding PEs at the unused ports of the first and second coupler) to provide three simultaneous outputs: AND, NOR, XOR (assuming positive logic and monotonically increasing PEs on the output ports, else the logic functions above are negated). If both the XOR output of the first coupler and the "other" output of the second coupler are of interest (may be considered useful outputs) then the efficiency of the linear combiner section (excluding excess insertion losses) is restored to 100% in this case. To summarize the reconfigurability properties of our all-optical gate design just introduced, using all four output ports of the two couplers, and also switching the reference between three possible values $R_L = 2^{-1/2}A$, $R_H = -2^{-1/2}A$, $R_M = 0$ to reconfigure the gate, we obtain at the $\Sigma$, $\Delta$ ports of the second coupler and at the $\Delta$ port of the first coupler respectively, the following logic functionality (FIG. 7):

FIG. 7 schematically depicts an All-Optical gate 70 design using all four output ports of the two couplers, wherein switching the reference between its three possible values gives at the output two or three logic functions of the inputs according to an exemplary embodiment of the current invention.

AND, NOR, XOR for the setting $R_L$ of the reference,
NOR, AND, XOR for the setting $R_H$ of the reference,
XOR, XNOR, XOR for the setting $R_M$ of the reference.

Next we redo the analysis above "recycling the unused ports" in the case of unipolar logic. It is readily seen that unused $\Delta$-port of the first coupler implements a XOR once it is followed up by a PE. Indeed, if the two $0 \backslash A$ inputs are identical, we get zero, else if they are different (one is zero, the other one is A) we get $\pm A$, mapped into High after taking the absolute value. It is further seen that the analysis conducted above for the bipolar case, relative to the roles of the $\Delta$ and $\Sigma$ ports also applies to the unipolar case. Simply all signals we found before at the inputs and outputs of the second coupler, are now right-shifted by A.

In case the XOR output (the $\Delta$-port of the first coupler) is not of interest, this output may be used along the lines discussed in the section above. There, we described how this output may be used to drive a phase modulator, effecting the phase reset (assuming antipodal signaling). The question arises how to realize the PM—this is now an all-optical PM. It turns out that the gain saturation mechanism again provides a means to address this issue. Actually the gain saturation is accompanied by "phase saturation" as well. We may view a gain medium with a control input and a probe input as an Amplitude-Phase Modulator (APM). Two different levels of optical power of the control translate into two different saturation levels of the population inversion, and subsequently two different levels of gain and phaseshift for the probe (the higher control power saturates more the population difference, providing lower gain and lower phase-shift). The block diagram for this scheme is described in FIG. 8.

Figure 8:
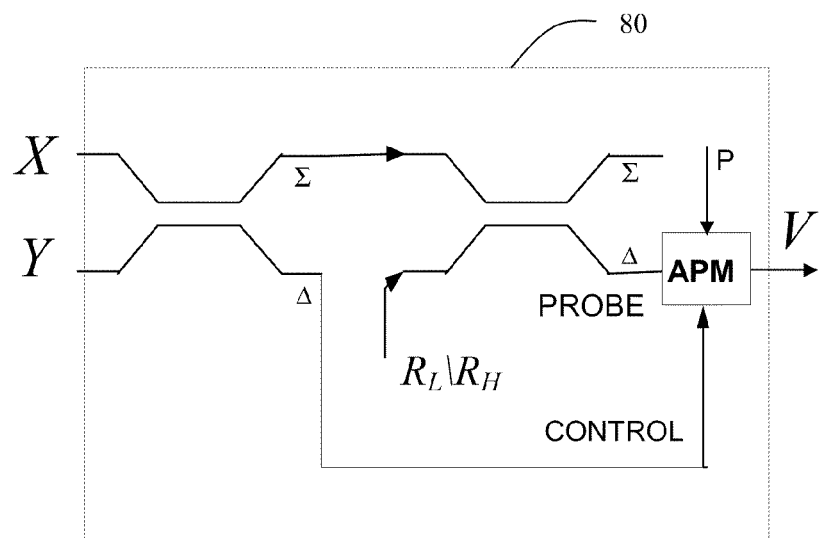
FIG. 8. Schematically depicts a realization of the PE by phase rotation exploiting the non-zero second output of the first coupler in the cases LH/HL according to an exemplary embodiment of the current invention.

FIG. 8 schematically depicts a realization of a PE 80 by phase rotation exploiting the non-zero second output of the first coupler in the cases LH/HL according to an exemplary embodiment of the current invention.

Here the "probe" input of the APM is connected to the output of the linear combiner (the $\Delta$-port of the second coupler). The APM main function is to invert the phase of the V output (the one corresponding to HL/LH) of the $\Delta$-port of the second coupler (i.e. apply phase inversion only when this output assumes the value A, not for the other values −A and 3A). This is effected by having either the $\Delta$-port of the first coupler, or alternatively the $\Sigma$-port of the second coupler act as control input of the APM (both these auxiliary ports assume High when the inputs into the gate are HL/LH), with the couplings and levels adjusted such that the phase-shift generated is precisely $\pi$ when this control input is High (i.e. when the inputs into the gate are HL/LH), such that the A signal is phase-rotated to −A, i.e. it is made to coincide with the LL case as required for an AND gate.

The problem is that there is also parasitic gain modulation due to the gain saturation, hence the two levels that are supposed to coincide after the phase rotation, will end up coinciding in phase but differing in amplitude, i.e. in the process of fixing the phases to be the same we altered the amplitudes, which are now no longer equal. It is possible to compensate for this impairment, by imbalancing the two amplitudes −A,A at the second coupler output to become r−A, r+A where r is the deviation of R away from its nominal A value. The amplitude associated with HL/LH is then made larger (relative to the amplitude for the LL case) since the HL/LH amplitude will be saturated down. Assuming that the coupling coefficient for optical intensity from the $\Delta$-port of the first coupler to the control input of the APM is c, then an equation relating the various quantities is $$|r - A|^2 = \frac{|r + A|^2}{1 + I/I_{sat}} = \frac{|r + A|^2}{1 + 2A^2 c/I_{sat}}$$

Figure 9:
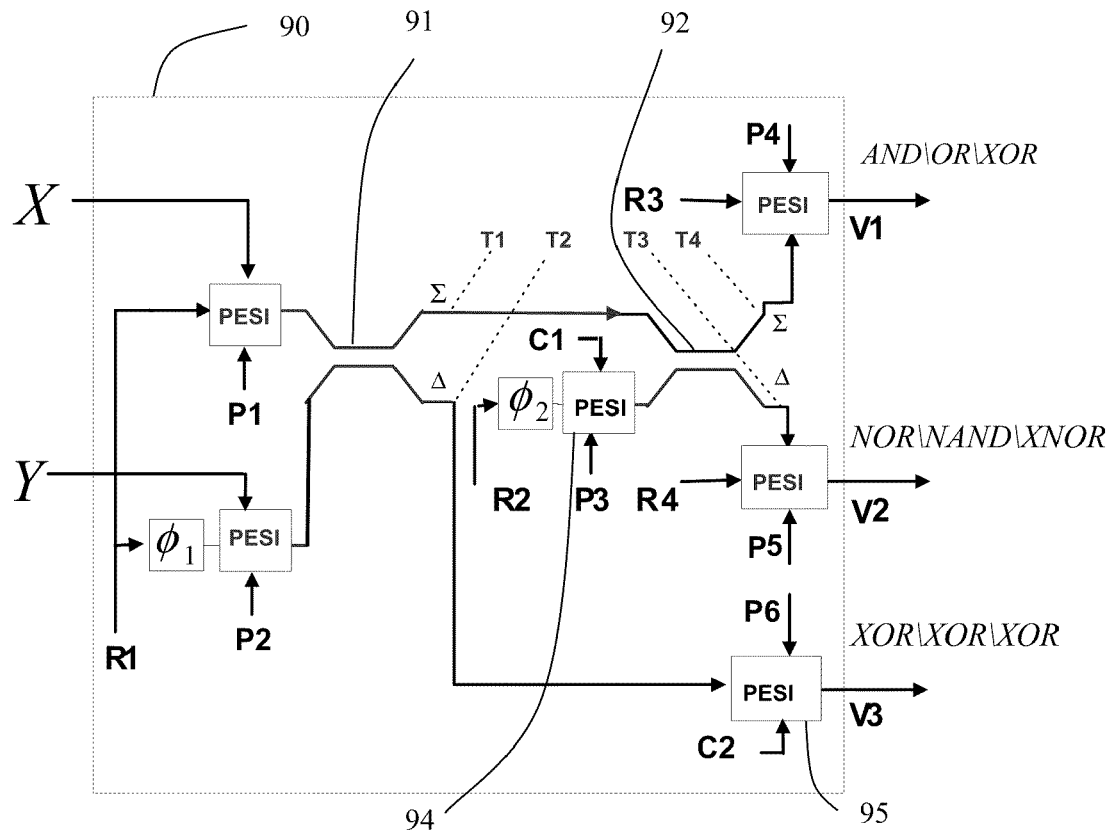
FIG. 9. Schematically depicts a reconfigurable logic gate detailed structure with calibration and tuning ports according to an exemplary embodiment of the current invention.

2.7 Reconfigurable Logic Gate—Detailed Structure with Calibration & Tuning Ports FIG. 9 schematically depicts a reconfigurable logic gate 90 detailed structure with calibration and tuning ports according to an exemplary embodiment of the current invention.

In this subsection we detail a preferred realization of the RLG (FIG. 9) providing a maximal number of logic outputs by using all coupler ports, and using all the light available at these ports, as explained in the last subsection. We further specify the measurement and control ports used in the calibration & tuning procedure, and briefly describe this procedure.

This realization is based on unipolar logic, though the scheme may be adapted to either bipolar or arbitrary level logic by applying additional level-shifting couplers onto the outputs. The unipolar logic naturally arises once PESI devices are used, as the lower output level of the PESI is zero (attained when the saturated gain drops under the loss), i.e. the PESI output is unipolar. Although in principle the input to the PESI does not have to be unipolar, i.e. a nonzero Low level may be feasible, it is convenient that the PESI input be unipolar, as the PESI output is. The PESI designed with pumping level selected such that when the PESI unipolar control input is off, then the gain provided by pumping exceeds the loss generating a high (saturated) probe output; when the control input is on, the gain provided by the pumping gets saturated providing a net gain falling under the loss, hence the probe decays to a very low value (ideally zero). For a given High input level, the PESI unipolar design is actually less stringent than a PESI design for two nonzero levels (as the Low nonzero input level would still cause some degree of saturation, detracting from the gain, relative to the case that the Low input is zero).

FIG. 9 describes the full-blown RLG design, with multiple reconfigurable outputs in parallel. The reconfiguration is attained by selecting the reference to be one of the three respective values $R_1 \in \{R_L, R_H, R_M\}$. In case just one or two inputs are required, the corresponding output PESI devices may be discarded, and the optical port terminated.

The function of the two input PESI devices is to provide input level restoration, allowing the gate to operate with a variety of input levels X, Y. The two inputs are calibrated to have their binary alphabets coinciding by scaling them relative to each other by means of the pump inputs P1, and P2. The phase bias θ1 preceding the Y-controlled PESI is intended to calibrate the relative phase out, rotating the phasor of the Y input into the first coupler to be collinear with that of the X input. Ideally the output of these two PESIs should be both zero for X=Y=L, and to be identical in magnitude and phase for X=Y=H. To attain this desired situation at calibration/setup time (or periodically during service cycles), the taps T1, T2 are photodetected, and the previous gates feeding the X and Y signals are required to cycle through all four combinations LL, LH, HL, HH for X and Y. When X=Y=H we should ideally get zero outputs at both T1,T2. The pumps P1,P2 may be adjusted if this is not the case. When X=Y=L, the PESI inverters ideally generate two high output values, which are subtracted at the Δ-port of the first coupler 91. In case the output T2 is not zero, then that is indicative of imbalance between the two High values of the inputs into the first coupler. The signal processing may also use the photodetected output of the T1 tap to provide useful information, possibly involving applying low-frequency dithering tones to the pumps and the phase tuner θ1, and lock-in detecting these tones or their harmonics in the taps T1, T2.

Once the logic inputs to the first coupler 91 are calibrated, those are used as a reliable basis to calibrate the reference R2 to the second coupler 92 to the particular values $\{R_L, R_H, R_M\}$ requisite for the unipolar scheme (with $R_L$, half way in amplitude between the zero corresponding to LL and the LH/HL values (or the average of HL and LH in the wake of imperfections), $R_H$ half way in amplitude between the LH/HL and the HH values, and $R_M$ coinciding with LH/HL values (or the average of HL and LH in the wake of imperfections) and the phasor R2 in either of the three cases being collinear with the HH phasor. The calibration of the R2 reference is effected by changing its amplitude by means of the pump P3, which effects the gain of the input PESI 94 to the second coupler 92 (which actually does not act as a PESI but simply as a tunable amplifier, thus it is missing one of its inputs), whereas the phase tuner θ2 is used to set the phase of R2 (possibly making up for the phaseshift incurred in the amplifier with pump P3). The actuation of P3 and θ2 is effected by means of a control loop acting on the output taps T3 and T4. As before the control algorithm possibly involves applying low-frequency dithering tones to the pump P3 and the phase tuner θ2, and lock-in detecting these tones or their harmonics in the taps T3, T4. Moreover, it is possible to cycle the inputs X, Y through their (already calibrated) input values, to aid in the calibration of the second coupler. Actually the calibration of the second coupler need not be conducted high precision, as the PESIs at its output may "take up the slack", "slicing-away" small variations. However, it is not desirable to deviate excessively from the ideal values, as the dynamic range (noise immunity of the system) may be reduced. The other evident function of the output PESIs is to erase the phases at the outputs of the second coupler. In fact, the scheme may work even without full PESIs (with ideal switching characteristic) but rather using plain PEs to erase the phases of the outputs of the second coupler. In particular, if the gate in question is the last output stage, and conversion to an electrical output is desired, these PEs (the output PESIs in FIG. 9) may simply be replaced by photodetectors (which are evidently sensitive to the intensity but not phase of the incident optical signals, hence providing the phase erasure function).

In general, an additional factor potentially limiting the number of gates to be cascaded, even in case all signal settings are ideal, is the Amplified Spontaneous Emission (ASE) noise, which keeps accumulating through the gates. Notice that the passive couplers generate no noise, however the ASE at the input into an ideal PESI (due to upstream gates) combines with that additively generated by the PESI itself, hence we get noise accumulation, though the mechanism is not simple linear addition of the noise variances as in an optical amplifier chain, since the noise is not riding on the probe signal, but rather is on the control signal which acts as "negative pump", reducing the gain through the mechanism of gain saturation.

From the previous section we recall that once the unused port of the second coupler is added in, we got at the respective ports V1, V2,V3 respectively (in the notation of the current figures):
AND, NOR, XOR for the setting $R_L$ of the reference,
NOR, AND, XOR for the setting $R_H$ of the reference,
XOR, XNOR, XOR for the setting $R_M$ of the reference.
Actually, this is not quite correct, as in the designs of FIG. 7 we have inverters (the PESIs) on both the inputs and the outputs, resulting in mapping the logic functions above according to De-Morgan's rules as follows:
AND->OR, NOR->NAND, XOR->XOR, XNOR->XONR, yielding at the respective ports V1, V2,V3 respectively
OR, NAND, XOR for the setting $R_L$ of the reference,
NAND, OR, XOR for the setting $R_H$ of the reference,
XOR, XNOR, XOR for the setting $R_M$ of the reference.

In FIG. 9, PESIs 94 and 95 are used as signal conditioning devices, thus their control inputs C1 and C2 respectively are fed with a known and constant input signal. Preferably, C1 and C2 are set to zero light level such that said inputs are not connected to any signal or alternatively missing from the physical device.

Figure 10:
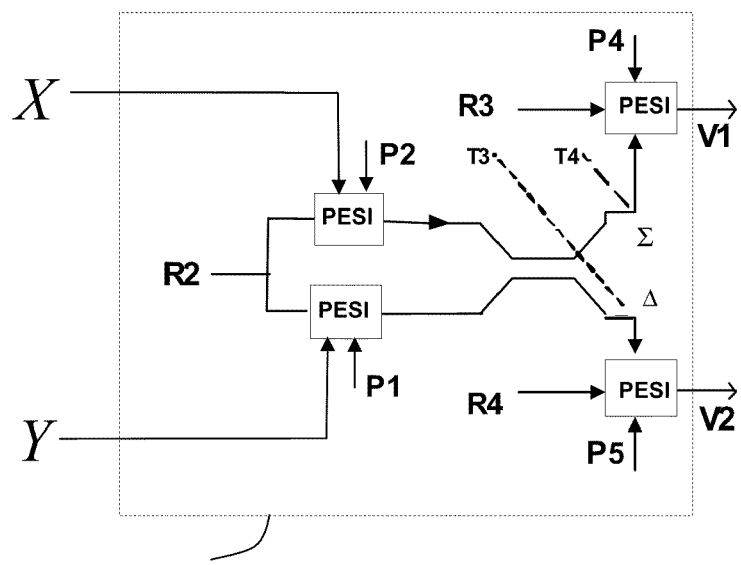
FIG. 10. Schematically depicts the case wherein ideal or nearly ideal PESIs are provided at the output, in that case, we may actually do away with the second coupler as previously explained, reducing the system to the less complex design according to an exemplary embodiment of the current invention.

If nearly ideal PESIs are provided at the output, then we may actually do away with the second coupler as previously explained, reducing the system to the less complex design of FIG. 10, nevertheless at the expense of a somewhat reduced dynamic range, and giving up the additional XNOR output (though XOR and XNOR are available for the $R2=R_M$ setting, but not in parallel with the other AND/NOR functions).

FIG. 10 schematically depicts a RLG 100 for the case wherein ideal or nearly ideal PESIs are provided at the output, in that case, we may actually do away with the second coupler as previously explained, reducing the system to the less complex design according to an exemplary embodiment of the current invention.

We again note that in case just one or two inputs are required, the other output PESI device may be discarded, and the coupler output optical port terminated.

It is noted that in this preferred embodiment all light signals traversing an interconnection of all-optical logic gates as disclosed, may be at a single wavelength, e.g. derived from a single optical source which simplifies the design. In terms of the coherence properties required by the light, we note that within each individual gate there is a requirement that the light be coherent (in fixed phase relationships between the various points), however there is no requirement of mutual coherence between different gates (although the light signals are all at the same wavelength or derived from the same source), which eases the design constraints.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An all-optical logic gate comprising:
   a linear optical section receiving at least two input wave fields X and Y, and linearly combining said inputs to produce an intermediary wave field output U; and
   at least one non-linear phase-erasing optical section that comprises an optically pumped amplifying medium for receiving said intermediary wave field output U of said linear optical section and for receiving a probe beam at a same wavelength as the intermediary wave field output U and producing a final output wave field V;
   wherein a complex amplitude of said final output wave field V depends solely on an amplitude of said intermediary wave field output U;
   wherein said at least two input wave fields X and Y and said final output wave field V of said all optical gate defined as complex two-valued logical alphabet that may be assigned the logic values True and False; and
   said final output wave field V of said gate is a known result of a Boolean logic function of said inputs.

2. The all-optical logic gate of claim 1 wherein said linear optical section further receives at least one reference wave field R to be linearly combined with said input wave fields, wherein complex amplitude values of said reference wave field R are selectable such that said final output wave V is selectable from multiple logic Boolean functions of said inputs.

3. The all-optical logic gate of claim 2 wherein said intermediate result U of said linear stage is a linear combination of said logic inputs X,Y and of a single reference R.

4. The all-optical logic gate of claim 3 wherein said intermediate result U of said linear stage is the linear combination $U=X+Y-R$.

5. The all-optical logic gate of claim 2 wherein the value of said reference R is selected such that an output of said Boolean logic function has a truth table selected from the group comprising: (N)AND; (N)OR; and X(N)OR.

6. The all-optical logic gate of claim 2 wherein said linear optical section receiving at least two inputs X and Y and one reference wave field R and producing an intermediate result U comprises: a) a first directional coupler (DC) having a first and a second inputs and a first and a second outputs, wherein, said two inputs are connected to inputs X and Y of said all-optical gate, and wherein said first output of said first DC is left dangling; and b) a second DC having a first and a second inputs and a first and a second outputs wherein, said first input of said second DC is fed by said second output of said first DC; said second input of said second DC is fed by said reference R, said first output of said second DC is left dangling, and said second output of said second DC is used as the output U of said linear stage.

7. The all-optical logic gate of claim 2 wherein said linear optical section receiving at least two inputs X and Y and one reference wave field R and producing an intermediate result U comprises: a) a first Y-Junction combiner having a first and a second inputs and one output, wherein, said two inputs are connected to inputs X and Y of said all-optical gate; and b) a second first Y-Junction combiner having a first and a second inputs and one output wherein, said first input of said second Y-Junction combiner fed by said output of said first Y-Junction combiner; said second input of said second Y-Junction combiner is fed by said reference R, and said output of said second Y-Junction combiner is used as the output U of said linear stage.

8. The all-optical logic gate of claim 2 wherein said linear optical section receiving at least two inputs X and Y and at least one reference wave field R and producing an intermediate result U comprises: a) a first Y-Junction combiner having a first and a second inputs and one output, wherein, said two inputs are connected to inputs X and Y of said all-optical gate; b) a second Y-Junction combiner having a first and a second inputs and one output, wherein, said two inputs are connected to two reference signals R'1 and R'2 respectively; and c) a third Y-Junction combiner having a first and a second inputs and one output wherein, said first input is fed by said output of said first Y-Junction combiner; said second input is fed by said output of said second Y-Junction combiner, and said output is used as the output U of said linear stage.

9. The all-optical logic gate of claim 8 wherein said first and said second inputs of said second Y-Junction combiner are connected to the same reference signal such that $R'_1=R'_2$.

10. The all-optical logic gate of claim 9 having $R'_1=R'_2=R'$, wherein the value or R' is selected such that said Boolean logic function is one of: (N)AND; (N)OR; and X(N)OR, depending on the value set for the reference signal R', and on the assignment of True/False to the complex input alphabet values.

11. The all-optical logic gate of claim 1 wherein the optically pumped amplifying medium is arranged to generate the final output wave field V by amplifying the probe beam by an available gain of the optically pumped amplifying medium, the available gain is affected only by the amplitude of the intermediary wave field output U.

12. The all-optical logic gate of claim 11 wherein the optically pumped amplifying medium is arranged to be saturated by the intermediary wave field output U.

13. The all-optical logic gate of claim 1 wherein said phase-eraser is insensitive to the phase of said intermediary output U, and further have a thresholding characteristic having output absolute amplitude |V| which is substantially a two-level function of the absolute amplitude |U| of said intermediate output.

14. The all-optical logic gate of claim 13 wherein said intermediate result U of said linear stage is a linear combination of X and Y only.

15. The all-optical logic gate of claim 14 wherein said intermediate result U of said linear stage is the linear combination $U=X+Y$.

16. The all-optical logic gate of claim 1 wherein said linear optical section further receiving at least two reference wave fields $R'_1$ and $R'_2$ to be linearly combined with said input wave fields, wherein the complex amplitude values of said reference wave fields $R'_1$ and $R'_2$ is selectable such that said final output wave V is selectable from multiple logic Boolean functions of said inputs, and wherein said intermediate result U of said linear stage is the linear combination $U=a(X+Y+R'_1+R'_2)$, wherein "a" is a scaling factor.

17. The all-optical logic gate of claim 16 wherein: said intermediate result U of said linear stage is the linear combination $U=aX+bY+S$; wherein "a" and "b", are a scaling factors, and wherein S is a linear combination of all reference values R of the form $S=(c_1R'_1\ c_2\ R_2+\ldots)$, wherein "$c_i$", are a scaling factors; and wherein values of said references $R'_i$ are selected such that output of said Boolean logic function has truth table selected from the group comprising: (N)AND; (N)OR; and X(N)OR.

18. The all-optical logic gate of claim 16 wherein said inputs X,Y assuming values in the complex alphabet $\{A_L, A_H\}$, wherein said linear section performs the linear combination U=X+Y−S wherein S is a linear combination of all reference values R of the form $S=(c_1 R'_1\, c_2 R'_2+\ldots)$, wherein "$c_i$", are a scaling factors; and wherein values of said references $R'_i$ are selected such that output of said Boolean logic functions, (N)AND, (N)OR, X(N)OR, by setting the individual references $R'_i$ such that S assumes a value selected from the group $\{0.5A_L+1.5A_H;\ 1.5A_L+0.5A_H;\ A_L+A_H\}$ respectively.

19. The all-optical logic gate of claim 16 wherein said inputs X,Y assuming values in the complex alphabet $\{A_L, A_H\}$, wherein said linear section performs the linear combination U=a(X+Y)+dS wherein "a" and "d" are scaling factors, and wherein S is a linear combination of all reference values R of the form $S=(c_1 R'_1+c_2 R'_2+\ldots)$, wherein "ci", are a scaling factors; and wherein values of said references R'i are selected such that output of said Boolean logic functions, (N)AND, (N)OR, X(N)OR, by setting the individual references R'i such that −(d/a)S assumes a value selected from the group $\{0.5A_L+1.5A_H;\ 1.5A_L+0.5A_H;\ A_L+A_H\}$ respectively.

20. The all-optical logic gate of claim 1 wherein said complex alphabet from which the logic inputs X and Y assume values is reduced to a real unipolar one $\{0,A\}$.

21. The all-optical logic gate of claim 1 wherein said complex alphabet from which the logic inputs X and Y assume values is reduced to a real bipolar one $\{+/-A\}$.

22. The all-optical logic gate of claim 1 wherein said phase-eraser (PE) comprises a non linear optical element selected from the group comprising: an optical gain medium; and an optical loss medium.

23. The all-optical logic gate of claim 22 wherein said phase-eraser comprises a saturable gain medium having: a pump input; a control input; a probe input and output, wherein: said pump input provides pump power for the operation of said gain medium; and said control input controls the propagation of probe signal from said probe input to said output by modifying said medium's gain saturation.

24. The all-optical logic gate of claim 23 wherein said control and probe signals are substantially orthogonal in at least one optical characteristic selected from the group comprising: spatial distribution; angular distribution; polarization; and propagation mode.

25. The all-optical logic gate of claim 23 wherein said control and probe signals have substantially different wavelengths.

26. The all-optical logic gate of claim 23 wherein said gain medium operates above transparency and provides gain to said probe signal when said control signal assumes its logic Low value, while the medium operates under transparency, and provides loss to the probe when the control assumes its logic High value, such that said PE exhibits a thresholding characteristic.

27. The all-optical logic gate of claim 23 and further comprising at least one phase modulator adopted to control the phase of said probe signal.

28. The all-optical logic gate of claim 23 and further comprising at least one phase-eraser connected to a calibrating control signal and used for calibrating amplitude of its output.

29. The all-optical logic gate of claim 1 wherein the probe beam is much weaker than the amplitude of the intermediary wave field output U.

30. An all-optical logic circuit comprising a plurality of interconnected all-optical logic gates;
   wherein at least two of said plurality of interconnected gates comprise:
   a linear optical section receiving at least two input wave fields X and Y, and linearly combining said inputs to produce an intermediary wave field output U; and
   at least one non-linear phase-erasing optical section that comprises an optically pumped amplifying medium for receiving said intermediary wave field output U of said linear optical section and for receiving a probe beam at a same wavelength as the intermediary wave field output U and producing a final output wave field V;
   wherein a complex amplitude of said final output wave field V depends solely on an amplitude of said intermediary wave field output U;
   wherein said at least two input wave fields X and Y and said final output wave field V of said all optical gate defined as complex two-valued logical alphabet that may be assigned the logic values True and False; and
   said final output wave field V of said gate is a known result of a Boolean logic function of said inputs.

* * * * *